(12) United States Patent
Sato

(10) Patent No.: US 9,444,377 B2
(45) Date of Patent: Sep. 13, 2016

(54) MOTOR DRIVE CONTROL DEVICE

(71) Applicant: DAIKIN INDUSTRIES, LTD., Osaka-shi, Osaka (JP)

(72) Inventor: Toshiaki Sato, Kusatsu (JP)

(73) Assignee: Daikin Industries, Ltd., Osaka (JP)

(*) Notice: Subject to any disclaimer, the term of this patent is extended or adjusted under 35 U.S.C. 154(b) by 33 days.

(21) Appl. No.: 14/417,011

(22) PCT Filed: May 10, 2013

(86) PCT No.: PCT/JP2013/063133
§ 371 (c)(1),
(2) Date: Jan. 23, 2015

(87) PCT Pub. No.: WO2014/017143
PCT Pub. Date: Jan. 30, 2014

(65) Prior Publication Data
US 2015/0207447 A1  Jul. 23, 2015

(30) Foreign Application Priority Data
Jul. 25, 2012 (JP) ................................. 2012-164599

(51) Int. Cl.
*H02P 6/04* (2016.01)
*H02P 6/20* (2016.01)
(Continued)

(52) U.S. Cl.
CPC . *H02P 6/20* (2013.01); *H02P 1/46* (2013.01); *H02P 6/18* (2013.01); *H02P 6/181* (2013.01)

(58) Field of Classification Search
USPC ............. 38/400.11, 101–103, 430, 434, 567, 38/162
See application file for complete search history.

(56) References Cited

U.S. PATENT DOCUMENTS 5,717,298 A * 2/1998 Tang ......................... H02P 6/20
318/400.11
5,857,349 A * 1/1999 Hamaoka .................. H02P 6/20
62/158

(Continued)

FOREIGN PATENT DOCUMENTS

DE  10 2008 037 543 A1  7/2009
JP  2005-137106 A  5/2005
(Continued)

OTHER PUBLICATIONS

European Search Report of corresponding EP Application No. 13 82 3361.4 dated Jul. 22, 2015.
(Continued)

*Primary Examiner* — Jorge L Carrasquillo
(74) *Attorney, Agent, or Firm* — Global IP Counselors

(57) ABSTRACT

A motor drive control device uses a rotor position sensorless control scheme to drive a motor. The motor drive control device includes a rotational speed deriving component, a startup component and a changing component. The rotational speed deriving component derives rotational speed of the motor just before startup of the motor. The startup component starts up the motor by outputting to the motor a drive signal based on at least one of a direct-current excitation scheme that fixes the rotor position in a predetermined position by performing direct-current energization, and a forced drive scheme that accelerates the motor to a predetermined rotational speed by performing forced energization that applies a predetermined voltage and frequency. The changing component changes the drive signal based on at least one of the direct-current excitation scheme and the forced drive scheme in accordance with the rotational speed of the motor derived.

16 Claims, 12 Drawing Sheets

(51) Int. Cl.
*H02P 6/18* (2016.01)
*H02P 1/46* (2006.01)

(56) References Cited

U.S. PATENT DOCUMENTS

| | | | |
|---|---|---|---|
| 2002/0117989 A1* | 8/2002 | Kawabata | H02P 1/46 318/700 |
| 2009/0167220 A1 | 7/2009 | Kanamori | |
| 2009/0261775 A1* | 10/2009 | Son | H02P 1/46 318/778 |
| 2009/0315492 A1* | 12/2009 | Oomura | H02P 6/20 318/400.02 |
| 2011/0031909 A1 | 2/2011 | Ohgushi | |
| 2011/0181215 A1 | 7/2011 | Nakagawara | |

FOREIGN PATENT DOCUMENTS

| | | | |
|---|---|---|---|
| JP | 2006-33946 A | | 2/2006 |
| JP | 2006033946 A | * | 2/2006 |
| JP | 2006-340422 A | | 12/2006 |
| JP | 2006340422 A | * | 12/2006 |
| JP | 2012-100533 A | | 5/2012 |
| JP | 2012125147 A | * | 6/2012 |

OTHER PUBLICATIONS

International Search Report of corresponding PCT Application No. PCT/JP2013/063133 dated Jul. 16, 2013.

International Preliminary Report of corresponding PCT Application No. PCT/JP2013/063133 dated Jan. 27, 2015.

\* cited by examiner

MOTOR DRIVE CONTROL DEVICE

CROSS-REFERENCE TO RELATED APPLICATIONS

This U.S. National stage application claims priority under 35 U.S.C. §119(a) to Japanese Patent Application No. 2012-164599, filed in Japan on Jul. 25, 2012, the entire contents of which are hereby incorporated herein by reference.

TECHNICAL FIELD

The present invention relates to a motor drive control device and particularly a motor drive control device that uses a rotor position sensorless control scheme to drive a motor having a rotor and a stator.

BACKGROUND ART

In air conditioning apparatus equipped with devices such as outdoor fans and compressors, many motors are used as power sources for these devices, and the motors are driven and controlled by motor drive control devices.

In recent years, from the standpoint of cost reduction, a motor drive control device that uses a rotor position sensorless control scheme to drive the motor has often been used. However, with the rotor position sensorless control scheme, it is impossible to detect the position of the rotor in an uncontrolled state, which is just before startup of the motor.

Particularly in a case where the motor is used as a drive source for an outdoor fan, when an external force resulting from the effect of wind, for example, acts on the outdoor fan even though the motor is not yet being driven, the motor also rotates. If the motor is started up in this state, there is the concern that problems will occur in the motor, such as motor current which, compared to a case where the motor normally starts up in a state in which no external force is acting on the outdoor fan like in the absence of wind, is large flowing or an overvoltage occurring due to a regenerative action. Consequently, the startup stability of the motor is compromised.

In order to address this issue, a technology is known which, as described in JP-A No. 2005-137106 for example, detects the phase of the rotor from an inductive voltage generated in the motor at the time when the output of a drive voltage from an inverter to the motor has stopped. In patent document 1, the motor is started up in accordance with the phase of the rotor that has been detected.

SUMMARY

Technical Problem

However, in JP-A No. 2005-137106, it is necessary to accurately detect the phase of the rotor, but in order to accurately detect the phase of the rotor, it becomes necessary to adjust the circuits configuring the motor drive control device in addition to various restrictions relating to the inductive voltage. For that reason, adjustment of the motor drive control device becomes complicated.

Moreover, in JP-A No. 2005-137106, a circuit for detecting the phase of the rotor becomes necessary, so costs also end up being incurred by that much.

Therefore, it is a problem of the present invention to ensure the startup stability of a motor simply and without incurring costs.

Solution to Problem

A motor drive control device pertaining to a first aspect of the present invention is a device that uses a rotor position sensorless control scheme to drive a motor having a rotor and a stator. The motor drive control device is equipped with a rotational speed deriving component, a startup component, and a changing component. The rotational speed deriving component derives the rotational speed of the motor at least at the time of a state just before startup of the motor. The startup component starts up the motor by outputting to the motor a drive signal based on at least either of a direct-current excitation scheme and a forced drive scheme. The direct-current excitation scheme is a scheme that fixes the rotor position in a predetermined position by performing direct-current energization with respect to the motor. The forced drive scheme is a scheme that accelerates the motor to a predetermined rotational speed by performing forced energization that applies a predetermined voltage and frequency with respect to the motor. The changing component changes, in accordance with the rotational speed of the motor that the rotational speed deriving component has derived, the drive signal based on at least either of the direct-current excitation scheme and the forced drive scheme.

In this motor drive control device, the drive signal based on the direct-current excitation scheme and/or the forced drive scheme is changed in accordance with the rotational speed of the motor at least at the time of a state just before startup of the motor. That is, the drive signal based on the direct-current excitation scheme and/or the forced drive scheme that is output to the motor in order to start up the motor changes in accordance with the rotational speed of the motor. Because of this, the motor is started up by the drive signal corresponding to the rotational speed of the motor at least at the time of a state just before motor startup, so the occurrence of an overcurrent and overvoltage condition can be suppressed, and the startup stability of the motor can be ensured simply and without incurring costs.

A motor drive control device pertaining to a second aspect of the present invention is the motor drive control device pertaining to the first aspect, wherein when the startup component starts up the motor by outputting to the motor the drive signal based on the direct-current excitation scheme, the changing component changes the voltage or current of the drive signal in accordance with the rotational speed of the motor.

Because of this, the motor can reliably start up even when the direct-current excitation scheme is employed, A motor drive control device pertaining to a third aspect of the present invention is the motor drive control device pertaining to the first aspect, wherein when the startup component starts up the motor by outputting to the motor the drive signal based on the forced drive scheme, the changing component changes the frequency, voltage, or current value of the drive signal in accordance with the rotational speed of the motor.

Because of this, the motor can reliably start up even when the forced drive scheme is employed.

A motor drive control device pertaining to a fourth aspect of the present invention is the motor drive control device pertaining to any of the first aspect to the third aspect, wherein the changing component continuously changes the voltage or current of the drive signal in accordance with the rotational speed of the motor during the period of time from when the motor begins to start up to until the motor reaches a normal rotational state.

Because of this, the drive signal that changes each moment in accordance with the rotational speed of the motor is output to the motor during the period of time from when the motor begins to start up to until the motor reaches a normal rotational state. Consequently, the occurrence of an overcurrent and an overvoltage is more reliably suppressed.

A motor drive control device pertaining to a fifth aspect of the present invention is the motor drive control device pertaining to any of the first aspect to the fourth aspect, wherein the changing component continuously changes the voltage or current of the drive signal in accordance with elapsed time from when the motor begins to start up.

Because of this, the drive signal corresponding to elapsed time from when the motor begins to start up is output to the motor. Consequently, the occurrence of an overcurrent and an overvoltage is more reliably suppressed.

A motor drive control device pertaining to a sixth aspect of the present invention is the motor drive control device pertaining to any of the first aspect to the fifth aspect, wherein in a case where the rotational speed of the motor just before startup is larger than a predetermined rotational speed, the changing component makes the voltage or current of the drive signal that is output to the motor in order to cause the motor to begin to start up smaller than a predetermined drive voltage or predetermined drive current that is output to the motor in a case where the motor begins to start up in a non-rotating state.

Depending on the case, sometimes the motor is already rotating at the time just before startup due to the effect of an external force such as wind, and the rotational speed of the motor is equal to or greater than the predetermined rotational speed. However, in a case where the rotational speed of the motor at the time just before startup is larger than the predetermined rotational speed, this motor drive control device makes, for example, the duty or amplitude of the drive voltage that is output to the motor in order to cause the motor to begin to start up smaller than a predetermined drive voltage duty or amplitude. Because of this, the motor drive control device can suppress the phenomenon where the amount of current energizing the motor and the voltage applied to the startup component become excessive when the motor that is already rotating at a certain rotational speed at the time just before startup has been started up, and can ensure the startup stability of the motor.

A motor drive control device pertaining to a seventh aspect of the present invention is the motor drive control device pertaining to any of the first aspect to the sixth aspect, wherein during the period of time from when the motor begins to start up to until the motor reaches a normal rotational state, the changing component increases the voltage or current of the drive signal as the rotational speed of the motor during that period of time becomes larger.

The rotational speed of the motor becomes larger each moment during the period of time from when the motor begins to start up to until the motor reaches a normal rotational state. Therefore, this motor drive control device increases the duty or amplitude of the drive voltage, for example, in accompaniment with the increase in the rotational speed of the motor during the period of time from when the motor begins to start, up to until the motor reaches the normal rotational state. Because of this, the phenomenon where the amount of current energizing the motor and the voltage applied to the startup component become excessive as well as a loss of synchronism of the motor can be suppressed, and the startup stability of the motor can be ensured.

A motor drive control device pertaining to an eighth aspect of the present invention is the motor drive control device pertaining to any of the fourth aspect to the seventh aspect, wherein during the period of time from when the motor begins to start up to until the motor reaches a normal rotational state, the changing component increases the voltage or current of the drive signal in accompaniment with elapsed time after startup begins.

During the period of time from when the motor begins to start up to until the motor reaches a normal rotational state, this motor drive control device increases the duty or amplitude of the drive voltage, for example, in accompaniment with elapsed time after startup begins. Because of this, the phenomenon where the amount of current energizing the motor and the voltage applied to the startup component become excessive as well as a loss of synchronism of the motor can be suppressed, and the startup stability of the motor can be ensured.

Advantageous Effects of Invention

According to the motor drive control device pertaining to the first aspect of the present invention, the occurrence of an overcurrent and overvoltage condition can be suppressed, and the startup stability of the motor can be ensured simply and without incurring costs.

According to the motor drive control device pertaining to the second aspect of the present invention, the motor can reliably start up even when the direct-current excitation scheme is employed.

According to the motor drive control device pertaining to the third aspect of the present invention, the motor can reliably start up even when the forced drive scheme is employed.

According to the motor drive control device pertaining to the fourth aspect and the fifth aspect of the present invention, the occurrence of an overcurrent and an overvoltage is more reliably suppressed.

According to the motor drive control device pertaining to the sixth aspect of the present invention, the phenomenon where the amount of current energizing the motor and the voltage applied to the startup component become excessive can be suppressed, and the startup stability of the motor can be ensured.

According to the motor drive control device pertaining to the seventh aspect and the eighth aspect of the present invention, the phenomenon where the amount of current energizing the motor and the voltage applied to the startup component become excessive as well as a loss of synchronism of the motor can be suppressed, and the startup stability of the motor can be ensured,

DESCRIPTION OF EMBODIMENTS

Motor drive control devices pertaining to the present invention will be described in detail below with reference to the drawings. The following embodiments are specific examples of the present invention and are not intended to limit the technical scope of the present invention.

<First Embodiment>

(1) Overview

Figure 1:
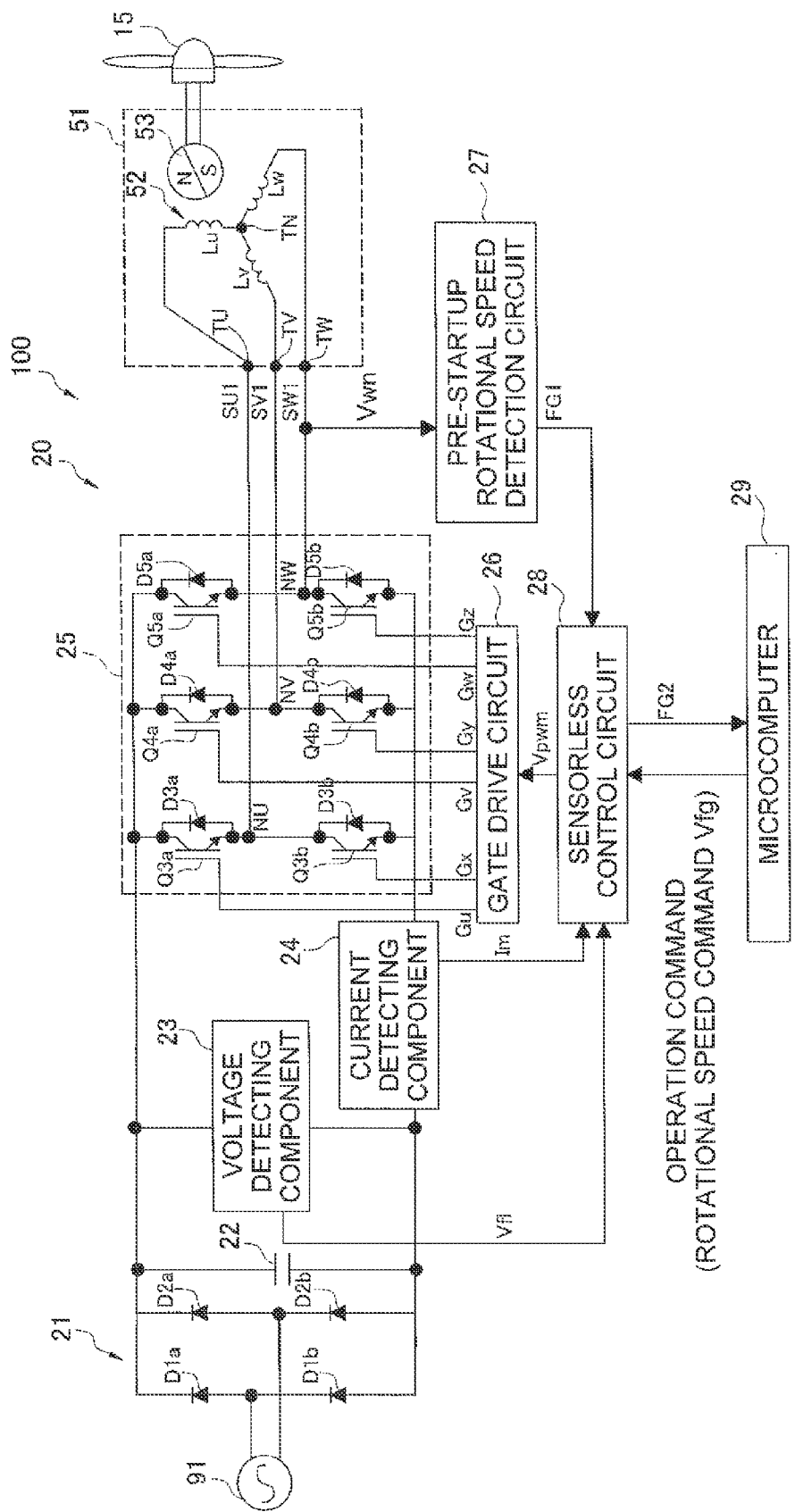
FIG. 1 is a block diagram showing the overall configuration of a system in which a motor drive control device pertaining to a first embodiment is employed and the internal configuration of the motor drive control device.

FIG. 1 is a configuration diagram of an entire motor drive control system 100 that includes a brushless DC motor 51 and a motor drive control device 20 pertaining to the present embodiment for driving the brushless DC motor 51. The brushless DC motor 51 is a fan motor used as a drive source for an outdoor fan 15, which is one device included in an outdoor unit 10 (see FIG. 2) of a heat pump device, and is an alternating-current motor driven by applying an alternating-current voltage thereto. The motor drive control device 20 is installed inside the outdoor unit 10.

(1-1) Outdoor Unit

Figure 2:
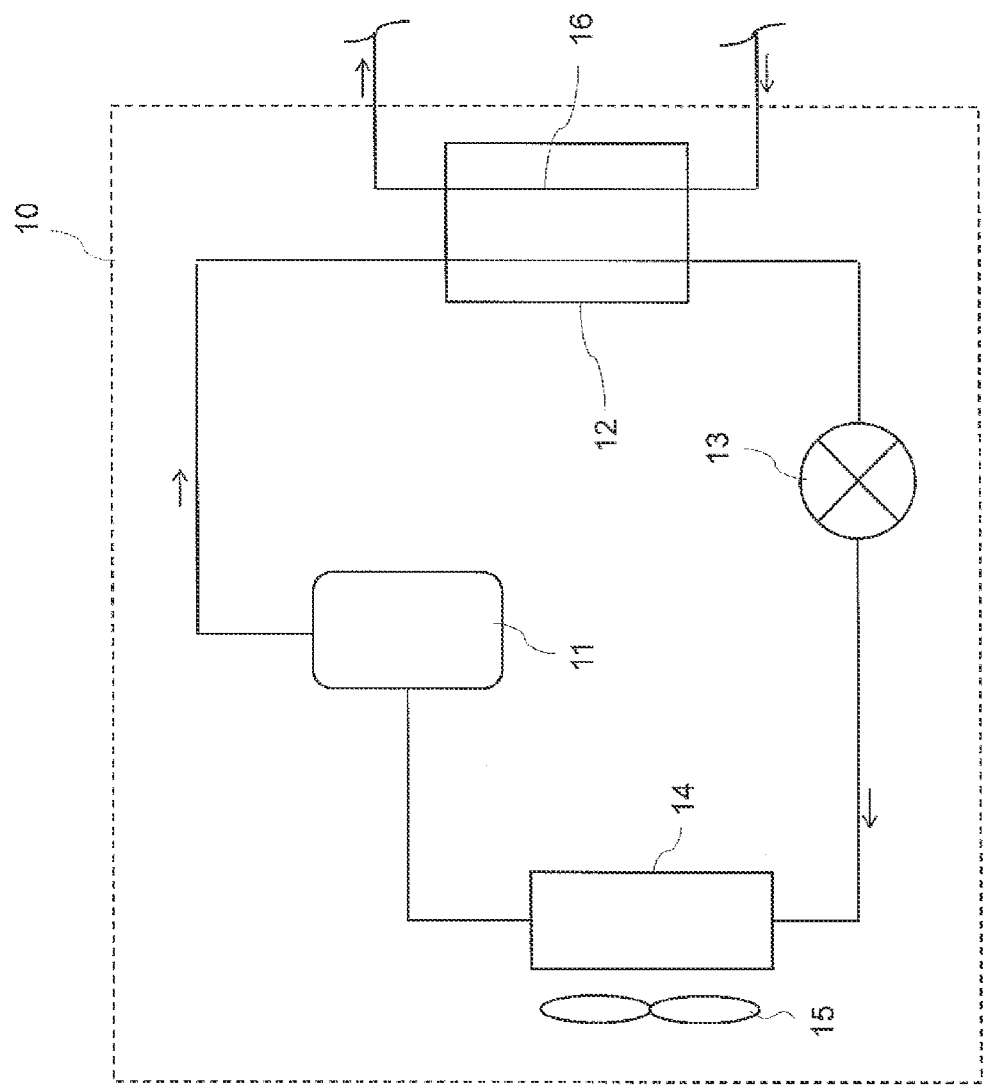
FIG. 2 is a diagram simply showing the configuration of an outdoor unit pertaining to a heat pump device.

Here, the outdoor unit 10 will be briefly described using FIG. 2. Here, as the heat pump device, description will be given taking an outdoor unit of a heat pump type water heater as an example. The outdoor unit 10 mainly has various devices such as a compressor 11, a water heat exchanger 12, an expansion valve 13, an evaporator 14, and the outdoor fan 15. The compressor 11, the water heat exchanger 12, the expansion valve 13, and the evaporator 14 are sequentially connected to configure a refrigeration cycle. The compressor 11 compresses refrigerant circulating in the refrigeration cycle, A heat exchange water passageway 16 through which passes water sent from a hot water storage tank unit (not illustrated in the drawings) connected to the outdoor unit 10 is disposed in the water heat exchanger 12, so that heat exchange can be performed between the water flowing through the heat exchange water passageway 16 and the refrigerant. The expansion valve 13 is an electrically controlled electrically powered valve and reduces the pressure of the refrigerant circulating in the refrigeration cycle. The evaporator 14 is for causing heat exchange to be performed between the refrigerant in the refrigeration cycle and air to thereby evaporate the refrigerant. The outdoor fan 15 is a propeller fan, for example, and rotates to thereby guide air from outside the outdoor unit 10 to the evaporator 14.

The outdoor unit 10 can cause the water heat exchanger 12 to function as a condenser and heat the water passing through the heat exchange water passageway 16 by driving the compressor 11 to circulate the refrigerant.

(1-2) Brushless DC Motor

Next, the brushless DC motor 51 will be described. The brushless DC motor 51 pertaining to the present embodiment is a 3-phase motor and is equipped with a stator 52 and a rotor 53. The stator 52 includes U-phase, V-phase, and W-phase drive coils Lu, Lv, and Lw connected in a star configuration. One end of the drive coil Lu, one end of the drive coil Lv, and one end of the drive coil Lw are connected to drive coil terminals TU, TV, and TW, respectively, of U-phase, V-phase, and W-phase lines extending from an inverter 25. The other ends of the drive coils Lu, Lv, and Lw are connected to one another as a terminal TN. The 3-phase drive coils Lu, Lv, and Lw generate inductive voltages corresponding to the rotational speed of the rotor 53 and the position of the rotor 53 when the rotor 53 rotates.

The rotor 53 includes a permanent magnet having plural poles comprising an N-pole and an S-pole and rotates about a rotating shaft relative to the stator 52, The rotation of the rotor 53 is output to the outdoor fan 15 via an output shaft (not illustrated in the drawings) lying on the same axis as the rotating shaft.

Below, the brushless DC motor 51 will be called the fan motor 51.

(2) Configuration of Motor Drive Control Device

Next, the configuration of the motor drive control device 20 pertaining to the present embodiment will be described. As shown in FIG. 1, the motor drive control device 20 pertaining to the present embodiment is equipped with a rectifying component 21, a smoothing capacitor 22, a voltage detecting component 23, a current detecting component 24, an inverter (which corresponds to a startup component) 25, a gate drive circuit 26, a pre-startup rotational speed detection circuit (which, together with a rotational speed estimating component 28c of a sensorless control circuit 28 described later, corresponds to a rotational speed deriving component) 27, a sensorless control circuit 28 (which mainly corresponds to a changing component), and a microcomputer 29.

These functional components configuring the motor drive control device 20 are mounted on one printed board, for example.

The gate drive circuit 26, the pre-startup rotational speed detection circuit 27, and the sensorless control circuit 28 may also be packaged in one integrated circuit package (specifically an IC or an HIC).

(2-1) Rectifying Component

The rectifying component 21 is configured in a bridge by four diodes D1a, D1b, D2a, and D2b. Specifically, the diodes D1a and D1b and the diodes D2a and D2b are connected in series to one another, respectively. The cathode terminals of the diodes D1a and D2a are both connected to the plus-side terminal of the smoothing capacitor 22 and function as a positive-side output terminal of the rectifying component 21. The anode terminals of the diodes D1b and D2b are connected to the minus-side terminal of the smoothing capacitor 22 and function as a negative-side output terminal of the rectifying component 21. The point of connection between the diodes D1a and D1b and the point of connection between the diodes D2a and D2b are each connected to a commercial power supply 91, That is, the point of connection between the diodes D1a and D1b and the point of connection between the diodes D2a and D2b fulfill the role of inputs of the rectifying component 21.

The rectifying component 21 having this configuration generates direct-current power by rectifying the alternating-current voltage output from the commercial power supply 91 and supplies the direct-current power to the smoothing capacitor 22.

(2-2) Smoothing Capacitor

The smoothing capacitor 22 has one end connected to the positive-side output terminal of the rectifying component 21 and has another end connected to the negative-side output terminal of the rectifying component 21. The smoothing capacitor 22 smooths the direct-current power supplied from the rectifying component 21, or in other words the voltage rectified by the rectifying component 21. Below, for convenience of explanation, the voltage after smoothing by the smoothing capacitor 22 will be called "the smoothed voltage Vfl". The smoothed voltage Vfl is a voltage that has a lower ripple than the voltage pertaining to the direct-current power and is applied to the inverter 25 connected to a later stage—that is, the output side—of the smoothing capacitor 22.

Examples of types of capacitors include electrolytic capacitors, ceramic capacitors, and tantalum capacitors, but in the present embodiment, a case where an electrolytic capacitor is employed as the smoothing capacitor 22 will be taken as an example, (2-3) Voltage Detecting Component The voltage detecting component 23 is connected to the output side of the smoothing capacitor 22 and detects the voltage between the ends of the smoothing capacitor 22, that is, the value of the smoothed voltage Vfl. In particular, the voltage detecting component 23 performs a voltage detection action after startup of the fan motor 51.

Although it is not illustrated in the drawings, the voltage detecting component 23 is, for example, configured as a result of two resistors connected in series to one another being connected in parallel to the smoothing capacitor 22 to divide the smoothed voltage Vfl, The voltage value at the point of connection between the two resistors is input to the sensorless control circuit 28.

(2-4) Current Detecting Component

The current detecting component 24 is connected between the smoothing capacitor 22 and the inverter 25 and to the negative-side output terminal side of the smoothing capacitor 22. The current detecting component 24 detects motor current Im flowing in the fan motor 51 after startup of the fan motor 51.

Although it is not illustrated in the drawings, the current detecting component 24 is, for example, configured by an amplifier circuit using a shunt resistor and an op-amp that amplifies the voltage between both ends of the resistor. The motor current Im detected by the current detecting component 24 is input to the sensorless control circuit 28.

(2-5) Inverter

The inverter 25 is connected to the output side of the smoothing capacitor 22. As shown in FIG. 1, the inverter 25 includes plural insulated-gate bipolar transistors (hereinafter simply called transistors) Q3a, Q3b, Q4a, Q4b, Q5a, and Q5b and plural freewheeling diodes D3a, D3b, D4a, D4b, D5a, and D5b. The transistors Q3a and Q3b, the transistors Q4a and Q4b, and the transistors Q5a and Q5b are connected in series to one another, respectively. The diodes D3a to D5b are connected in parallel to the transistors Q3a to Q5b, respectively, as a result of the collector terminals of the transistors and the cathode terminals of the diodes being connected to one another and the emitter terminals of the transistors and the anode terminals of the diodes being connected to one another.

The smoothed voltage Vfl from the smoothing capacitor 22 is applied to the inverter 25. Additionally, the inverter 25 generates drive voltages SU1, SV1, and SW1 having a desired duty as a result of the transistors Q3a to Q5b being switched on and off at timings instructed by the gate drive circuit 26. The drive voltages SU1, SV1, and SW1 are alternating-current voltages for driving the fan motor 51 and are output to the fan motor 51 from points of connection NU, NV, and NW between the transistors Q3a and Q3b, the transistors Q4a and Q4b, and the transistors Q5a and Q5b. That is, the inverter 25 supplies electrical power to the fan motor 51.

When starting up the fan motor 51, the inverter 25 pertaining to the present embodiment starts up the motor 51 by outputting to the fan motor 51 the drive voltages SU1, SV1, and SW1 based on a forced drive scheme. The forced drive scheme is a scheme that accelerates the motor to a predetermined rotational speed by performing forced energization with respect to the fan motor 51. In a case where the motor has been accelerated to the predetermined rotational speed and it has become possible for the position of the rotor 53 to be estimated, the drive scheme moves from the forced drive scheme to position estimation driving, or in other words rotor position sensorless control. That is, in the forced drive scheme, regardless of the position of the rotor 53 of the fan motor 51, the drive voltages SU1, SV1, and SW1 having a predetermined voltage value and frequency are applied to the fan motor 51 to thereby forcibly cause the fan motor 51 to begin to start up. Consequently, in the forced drive scheme, in contrast to a direct-current excitation scheme described in a second embodiment later, the action of temporarily fixing the position of the rotor 53 before beginning to drive the fan motor 51 is not performed, and the drive voltages SU1, SV1, and SW1 that can drive the fan motor 51 no matter what the state of the fan motor 51 become output from the inverter 25 to the fan motor 51. Because of this, the fan motor 51 is forced to start up.

Additionally, the inverter 25 pertaining to the present embodiment causes the fan motor 51 to begin to start up using the drive voltages SU1, SV1, and SW1 in the forced drive scheme that have a frequency or voltage value corresponding to the rotational speed of the fan motor 51 at least just before startup. Additionally, after startup of the fan motor 51 begins, the inverter 25 outputs to the fan motor 51 the drive voltages SU1, SV1, and SW1 in the forced drive scheme that have a frequency or voltage value corresponding to the rotational state of the fan motor 51 during startup.

That is, when the conventional forced drive scheme had been used to start up the fan motor 51, the inverter had output drive voltages having no relation to the rotational speed of the fan motor 51, or in other words drive voltages having a fixed frequency or voltage value. However, when the inverter 25 pertaining to the present embodiment starts up the fan motor 51 using the forced drive scheme, the inverter 25 outputs to the fan motor 51 the drive voltages SU1, SV1, and SW1 that have a frequency or voltage value corresponding to the actual rotational state and which can forcibly start up the fan motor 51 no matter what the position of the rotor 53, That is, it can be said that the drive voltages SU1, SV1, and SW1 at the time of startup pertaining to the present embodiment are voltages in which the frequency or voltage value of the drive voltages that had been output to the fan motor 51 when starting up the motor 51 using the conventional forced drive scheme has changed in accordance with the actual rotational state of the fan motor 51.

Figure 3:
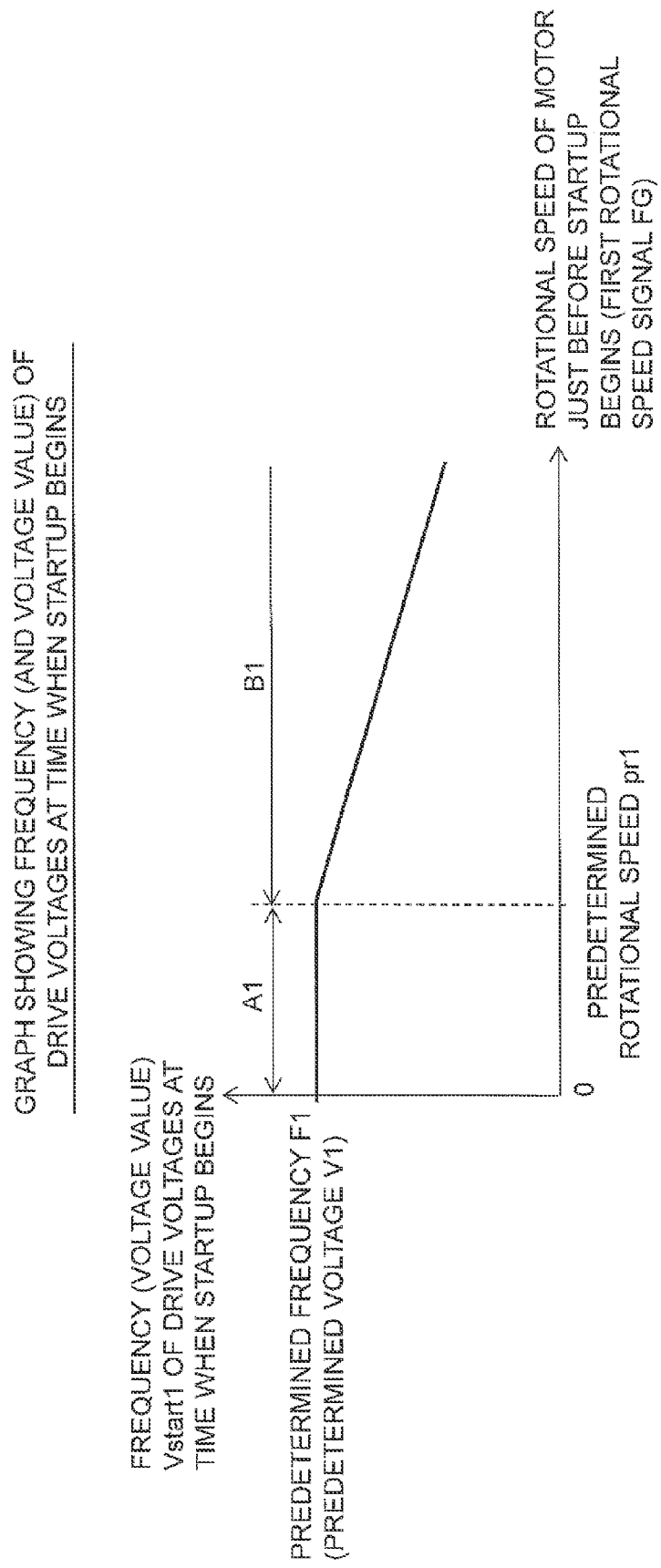
FIG. 3 is a graph conceptually showing the relationship between the rotational speed of a fan motor just before startup begins and the frequency of drive voltages (or the voltage value of the drive voltages) at the time when startup begins.

FIG. 3 is a graph showing, as a concept, a frequency and voltage value Vstart1 of the drive voltages SU1, SV1, and SW1 at the time when startup begins with respect to the rotational speed of the fan motor 51 just before startup begins. In FIG. 3, the horizontal axis shows the rotational speed of the fan motor 51 just before startup begins (i.e., the rotational speed that has been detected by the pre-startup rotational speed detection circuit 27 described later; a first rotational speed signal FG1), and the vertical axis shows the frequency and voltage value Vstart1 of the drive voltages SU1, SV1, and SW1 that are output to the fan motor 51 at the time when startup begins. As shown in rotational speed interval A1 in FIG. 3, in a case where the rotational speed of the fan motor 51 just before startup begins is smaller than a predetermined rotational speed pr1, the frequency (or voltage value) Vstart1 of the drive voltages SU1, SV1, and SW1 is set to a predetermined frequency F1 (or a predetermined voltage value V1). However, as shown in rotational speed interval B1 in FIG. 3, in a case where the rotational speed of the fan motor 51 just before startup begins is larger than the predetermined rotational speed pr1, the frequency (or voltage value) Vstart1 of the drive voltages SU1, SV1, and SW1 is set to a frequency (or voltage value) smaller than the predetermined frequency F1 (or predetermined voltage value V1).

Here, the predetermined frequency F1 and the predetermined voltage value V1 are a frequency and a voltage value of the drive voltages that are output to the fan motor 51 in a case where the motor 51 begins to start up in a non-rotating state. The frequency (or voltage value) with respect to the predetermined rotational speed pr1 and the frequency (or voltage value) with respect to a rotational speed equal to or greater than the rotational speed pr1 are set to appropriate values beforehand by desktop calculation, simulation, or experiment on the basis of the characteristics of the fan motor 51, the outdoor fan 15, and the evaporator 14.

That is, in the present embodiment, in a case where the fan motor 51 that is not yet being driven is already rotating a certain extent due to the effect of an external force or inertial force just after rotation has been stopped, a voltage command value Vpwm that reduces the frequency or voltage value Vstart1 of the drive voltages SU1, SV1, and SW1 that are output to the fan motor 51 in order to cause the motor 51 to begin to start up is generated by the sensorless control circuit 28 described later.

As described later, the rotational speed estimating component 28c pertaining to the sensorless control circuit 28 cannot correctly estimate the rotational speed of the fan motor 51 just before startup or in a state in which the rotational speed is low. For that reason, although its detailed configuration is not shown in FIG. 6, the sensorless control circuit 28 in this case uses the rotational speed of the fan motor 51 just before startup that has been detected by the pre-startup rotational speed detection circuit 27.

Figure 4:
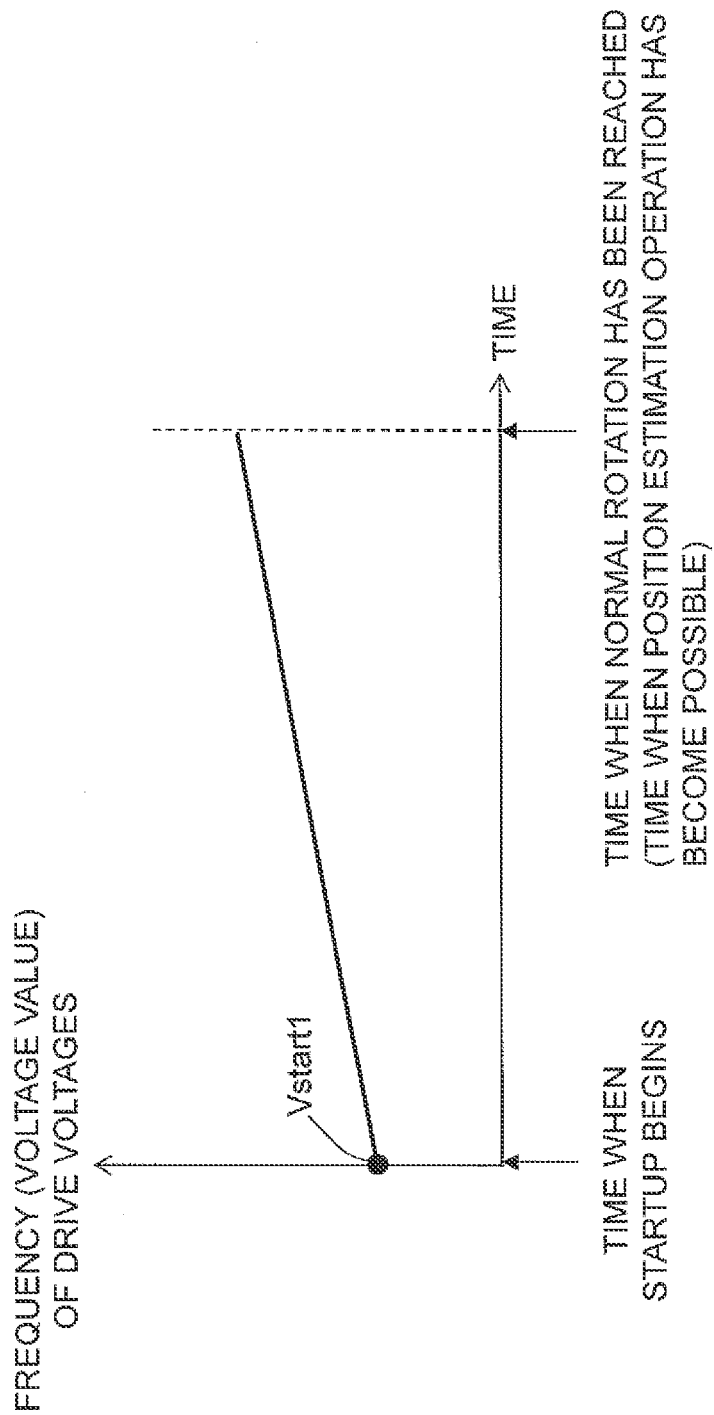
FIG. 4 is a graph conceptually showing, as an example, a temporal change in the frequency of the drive voltages (or the voltage value of the drive voltages) from just after startup of the fan motor begins to until the fan motor reaches a normal rotational state.

FIG. 4 is a graph conceptually showing a temporal change in the frequency and voltage value of the drive voltages SU1, SV1, and SW1 that are output to the fan motor 51 during the period of time from just after startup of the fan motor 51 begins to until the fan motor 51 reaches a normal rotational state. As mentioned above, in a state in which the rotational speed is low, the rotational speed cannot be correctly estimated, so the rotational speed is inferred by the passage of time in regard to a rotational state during startup. In FIG. 4, the horizontal axis shows time and the vertical axis shows the frequency and voltage value of the drive voltages SU1, SV1, and SW1. As shown in FIG. 4, during the period of time from just after startup of the fan motor 51 begins to until the fan motor 51 reaches a normal rotational state (i.e., a state which a position estimation operation has become possible), the inverter 25 outputs to the fan motor 51 the drive voltages SU1, SV1, and SW1 whose frequency or voltage value becomes larger over time.

As described above, during the period of time from just before startup of the fan motor 51 to until the fan motor 51 reaches a normal rotational state, the inverter 25 pertaining to the present embodiment outputs to the fan motor 51 the drive voltages SU1, SV1, and SW1 in the forced drive scheme that have a frequency and voltage value corresponding to the actual rotational speed of the fan motor 51. Because of this, compared to the case of using the conventional forced drive scheme to start up the fan motor 51 that is already rotating before startup due to the effect of an external force such as wind or inertial force just after rotation has been stopped, it becomes difficult for an overcurrent condition, an overvoltage condition, and a loss of synchronism condition to occur.

In other words, if the fan motor 51 is already rotating due to the effect of an external force such as wind or inertial force just after rotation has been stopped, the voltage induced to the fan motor 51 rises because of this rotation. In this state, if drive voltages having a fixed frequency and voltage are applied to the fan motor 51 using the forced drive scheme regardless of the actual rotational speed of the fan motor 51, drive voltages having a fixed frequency and voltage become added to the voltage already being induced to the motor 51 because the drive voltages are drive voltages assumed to start up the fan motor 51 originally in a non-rotating state, and as a result, an overcurrent, an overvoltage, and a loss of synchronization in the motor are caused. However, in the present embodiment, although the fan motor 51 is started up using the forced drive scheme, the drive voltages SU1, SV1, and SW1 in this case have a frequency and voltage taking into consideration the actual rotational speed of the fan motor 51, so the values of the motor current and voltage based on the drive voltages SU1, SV1, and SW1 that are further added to the voltage being induced to the motor 51 become appropriate values corresponding to the rotational speed at each moment of the fan motor 51. Consequently, it becomes difficult for an overcurrent, an overvoltage, and a loss of synchronism of the motor to occur.

In the description above, an example was described where both the frequency and the voltage are changed, but either one of the frequency and the voltage may also be changed.

(2-6) Gate Drive Circuit

The gate drive circuit 26 changes the on and off states of the transistors Q3a to Q5b of the inverter 25 on the basis of the voltage command value Vpwm from the sensorless control circuit 28. Specifically, the gate drive circuit 26 generates gate control voltages Gu, Gx, Gv, Gy, Gw, and Gz that are applied to the gates of the transistors Q3a to Q5b in such a way that the drive voltages SU1, SV1, and SW1 having the duty that has been decided by the sensorless control circuit 28 are output from the inverter 25 to the fan motor 51. The gate control voltages Gu, Gx, Gv, Gy, Gw, and Gz that have been generated are applied to the gate terminals of the transistors Q3a to Q5b.

Here, the voltage command value Vpwm pertaining to the present embodiment is a command value for determining the duty of the drive voltages SU1, SV1, and SW1, which is one parameter relating to the drive voltages SU1, SV1, and SW1.

In other words, in the present embodiment, a case where the fan motor 51 is controlled by pulse width modulation is taken as an example.

(2-7) Pre-startup Rotational Speed Detection Circuit

The pre-startup rotational speed detection circuit 27 has an input connected to the W-phase drive coil terminal TW of the fan motor 51 and has an output connected to the sensorless control circuit 28. That is, it can be said that the pre-startup rotational speed detection circuit 27 is positioned on a later stage side of the inverter 25. The pre-startup rotational speed detection circuit 27 detects the rotational speed of the fan motor 51 before startup on the basis of a W-phase inductive voltage Vwn generated in the drive coil Lw when the fan motor 51 is rotating mainly before startup.

Figure 5:
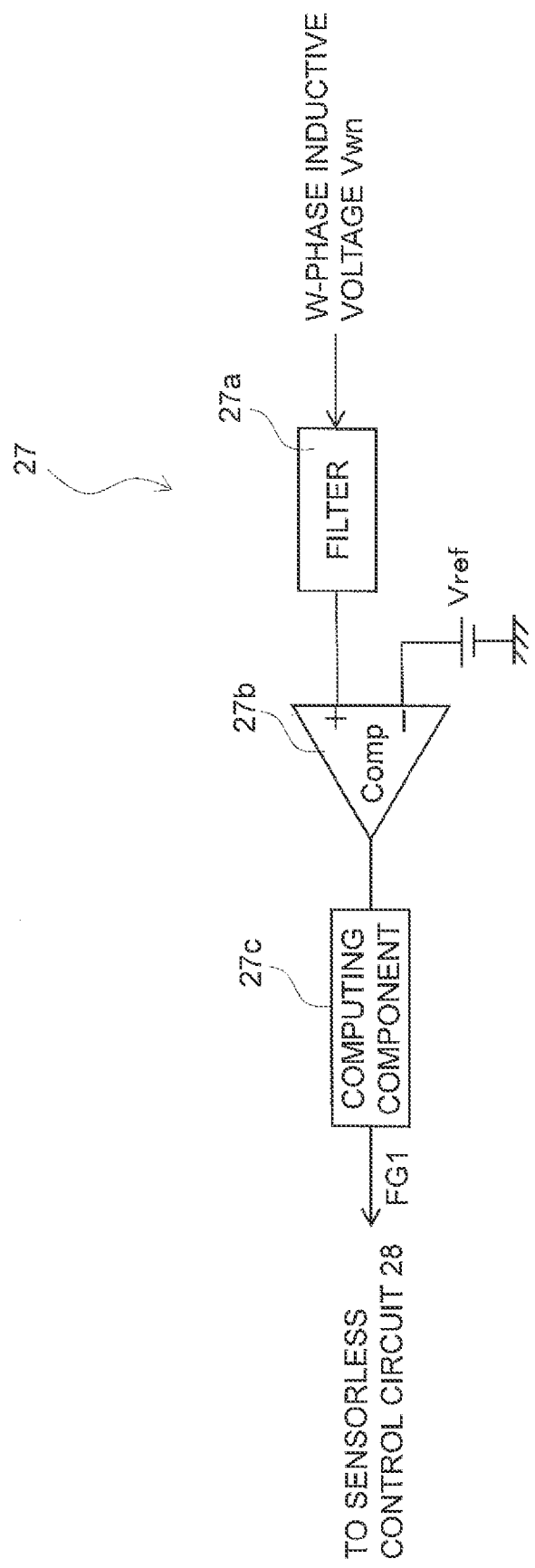
FIG. 5 is a diagram simply showing an example of the configuration of a pre-startup rotational speed detection circuit.

FIG. 5 simply shows an example of the configuration of the pre-startup rotational speed detection circuit 27. FIG. 5 shows a case where the pre-startup rotational speed detection circuit 27 is configured by a filter 27a, a comparator 27b, and a computing component 27c. The filter 27 is a low-pass filter, for example, has the inductive voltage Vwn of the rotating fan motor 51 input to it, and removes the noise component and the harmonic component from the inductive voltage Vwn. The inductive voltage Vwn after passing through the filter 27a and a reference voltage Vref having a predetermined voltage value are input to the comparator 27b. On the basis of the magnitudes of these voltages that have been input, the comparator 27b outputs a pulse voltage based on the inductive voltage Vwn. The pulse voltage is input to the computing component 27c, which computes the frequency of the voltage to compute the rotational speed of the fan motor 51. A first rotational speed signal FG1 indicating the rotational speed of the fan motor 51 before startup that has been found in this way becomes a pulse signal having a period corresponding to the rotational speed of the motor 51 or a pulse signal in which the frequency of the signal is fixed but which has a duty corresponding to the rotational speed of the motor 51. The rotational speed signal FG1 is input to the sensorless control circuit 28.

According to the pre-startup rotational speed detection circuit 27 described above, it becomes possible to detect the rotational speed of the fan motor 51 even in a case where the position of the rotor 53 cannot be estimated using a rotor position sensorless scheme described later, such as when the fan motor 51 that has not been started up is rotating due to the effect of an external force such as wind or inertial force just after rotation has been stopped.

In the present embodiment, the pre-startup rotational speed detection circuit 27 has a configuration that simply detects the rotational speed regardless of whether the rotational direction of the fan motor 51 before startup is a forward direction or a reverse direction.

(2-8) Sensorless Control Circuit

The sensorless control circuit 28 is connected to the voltage detecting component 23, the current detecting component 24, the gate drive circuit 26, the pre-startup rotational speed detection circuit 27, and the microcomputer 29. The sensorless control circuit 28 is a circuit that uses a rotor position sensorless scheme to drive the fan motor 51.

Specifically, the sensorless control circuit 28 uses the rotor position sensorless scheme to estimate the position of the rotor 53 of the fan motor 51 after startup and estimate the rotational speed of the fan motor 51 on the basis of the estimated position of the rotor 53. Below, a signal indicating the rotational speed of the fan motor 51 after startup will be called "the second rotational speed signal FG2". The second rotational speed signal FG2 is input to the microcomputer 29. Moreover, when an operation command including a rotational speed command Vfg is sent from the microcomputer 29 to the sensorless control circuit 28, the sensorless control circuit 28 uses the rotor position sensorless scheme to decide, as the voltage command value Vpwm, the duty of the drive voltages SU1, SV1, and SW1 on the basis of the operation command, the estimated position of the rotor 53, the estimated rotational speed, the detection result of the voltage detecting component 23, and the detection result of the current detecting component 24, Here, the rotor position sensorless scheme is a scheme that performs an estimation of the position of the rotor 53, an estimation of the rotational speed, PI control with respect to the rotational speed, and PI control with respect to the motor current Im using various parameters indicating the characteristics of the fan motor 51, the smoothed voltage Vfl (i.e., the detection result of the voltage detecting component 23), the motor current Im (i.e., the detection result of the current detecting component 24), and a predetermined mathematical model relating to the control of the fan motor 51. Examples of the various parameters indicating the characteristics of the fan motor 51 include the coil resistance of the fan motor 51 that is used, the inductance component, the inductive voltage, and the number of poles.

Figure 6:
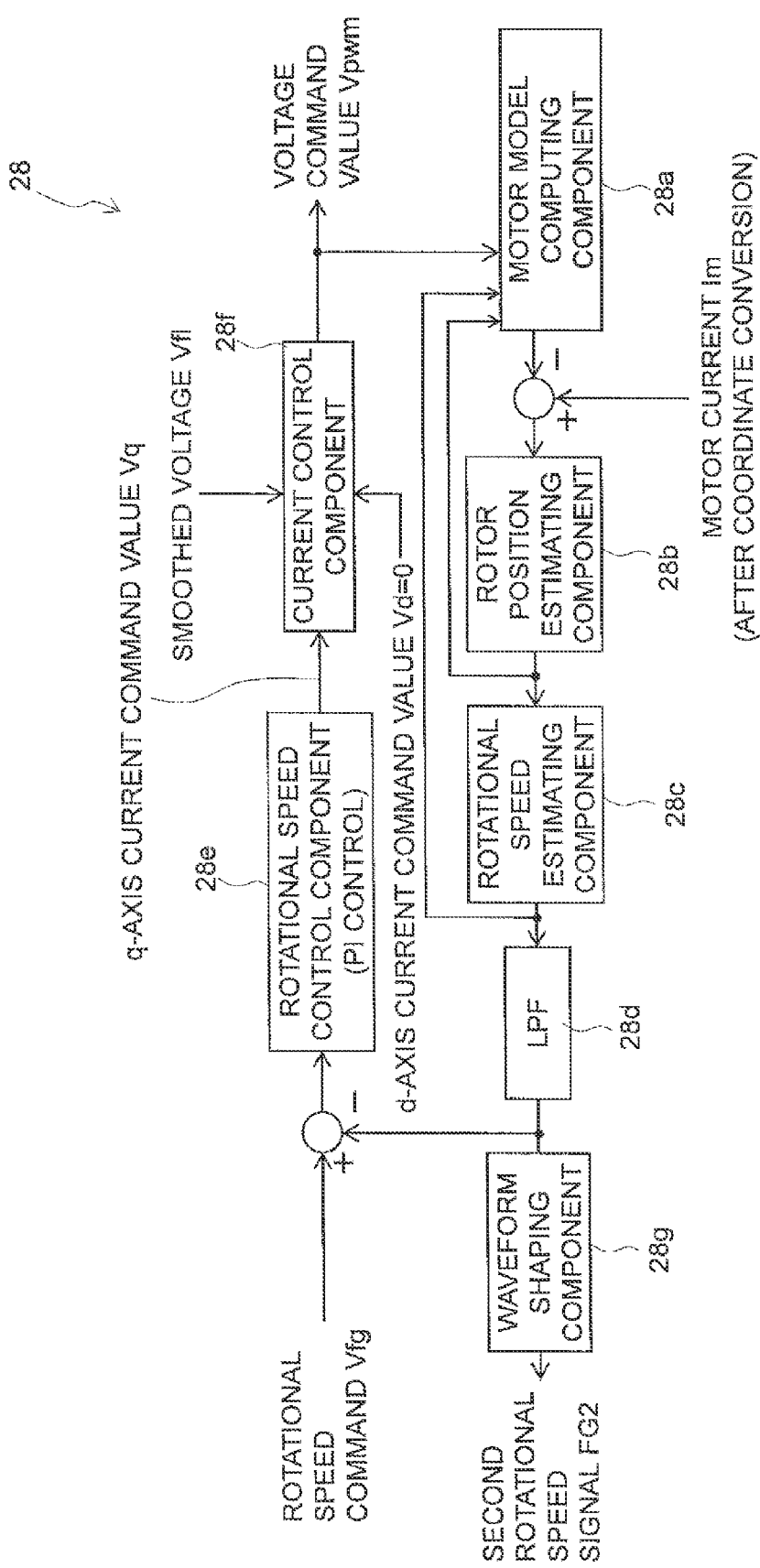
FIG. 6 is a block diagram simply showing an example of the configuration of a sensorless control circuit.

FIG. 6 simply shows an example of the configuration of the sensorless control circuit 28 that performs rotor position sensorless control in consideration of a mathematical model. The sensorless control circuit 28 of FIG. 6 is mainly configured by a motor model computing component 28a, a rotor position estimating component 28b, a rotational speed estimating component 28c (which, together with the pre-startup rotational speed detection circuit 27, corresponds to a rotational speed deriving component), an LPF 28d, a rotational speed control component 28e, and a current control component 28f.

The motor model computing component 28a uses, as a motor model, the various parameters indicating the characteristics of the fan motor 51 to compute an ideal value of the motor current Im from the voltage command value Vpwm to the motor 51, the estimated position of the rotor 53, and the estimated rotational speed. The rotor position estimating component 28b takes the result of subtraction processing having been performed between this ideal value and the motor current Im that has actually been detected by the current detecting component 24 as its input, and estimates the position of the rotor 53 at the current point in time. The rotational speed estimating component 28c uses the position of the rotor 53 that has been estimated to estimate the rotational speed of the fan motor 51 at the current point in time. The estimation results of the estimating components 28b and 28c are used in the motor model computing component 28a in correction processing by which the difference between the ideal value of the motor current Im and the actual motor current Im becomes "0" and in correction of the motor model. The LPF 28d removes the noise component and the harmonic component from the rotational speed that has been estimated. The rotational speed of the fan motor 51 that has been output from the LPF 28d becomes the desired second rotational speed signal FG2 because of a waveform shaping component 28g and is output to the microcomputer 29. The second rotational speed signal FG2 is, like the first rotational speed signal FG1, a pulse signal having a period corresponding to the rotational speed of the fan motor 51 or a pulse signal whose frequency is fixed but which has a duty corresponding to the rotational speed of the motor 51.

Furthermore, subtraction processing is performed between the rotational speed of the fan motor 51 that has been output from the LPF 28*d* and the rotational speed command Vfg included in the operation command that has been sent from the microcomputer 29. The rotational speed control component 28*e* performs PI control with respect to the rotational speed when the result of the subtraction processing is input to it. The current control component 28*f* performs current control on the basis of a q-axis current command value Vq that is the result of control by the rotational speed control component 28*e*, a command "Vd=0" by which a d-axis current command value Vd becomes "0" for example, and the smoothed voltage Vfl that has been detected by the voltage detecting component 23, and the current control component 28*f* generates the voltage command value Vpwm by which the motor current Im becomes a current based on these commands. Because of this control by the current control component 28*f*, the voltage command value Vpwm including the duty of the drive voltages SU1, SV1, and SW1 is generated and input to the gate drive circuit 26. Furthermore, the voltage command value Vpwm is input to the motor model computing component 28*a* where further correction of the motor model is performed.

Here, in the present embodiment, the sensorless control circuit 28 uses a d-q coordinate system in which the d-axis is defined as the direction of the magnetic flux created by the permanent magnet of the rotor 53 and the q-axis is defined as a direction advanced $\pi/2$ from there. The "q-axis current command value Vq" is a command value of the q-axis current that contributes to the torque of the fan motor 51, and the "d-axis current command value Vd" is a command value of the d-axis current (i.e., the excitation current that is the component that creates the magnetic flux) that does not contribute to the torque of the fan motor 51.

It can be said that the sensorless control circuit 28 having this configuration performs an estimation of the position of the rotor 53 and an estimation of the rotational speed of the fan motor 51 and outputs the voltage command value Vpwm corresponding to the results of these estimations when control of the inverter 25 is being performed by the microcomputer 29 and the gate drive circuit 26.

Additionally, the sensorless control circuit 28 having this configuration performs an action that changes, in accordance with the rotational speed just before startup at least at the time of a state just before startup of the fan motor 51, the frequency or voltage value of the drive voltages SU1, SV1, and SW1 based on the forced drive scheme in order to ensure that the action of outputting the drive voltages SU1, SV1, and SW1 described in "(2-5) Inverter" is realized. Specifically, during the period of time from when the fan motor 51 begins to start up to until the fan motor 51 reaches a normal rotational state, the sensorless control circuit 28 continuously changes the frequency or voltage value of the drive voltages SU1, SV1, and SW1 based on the forced drive scheme in accordance with elapsed time. For example, as shown in FIG. 4, during the period of time from just after startup of the fan motor 51 begins until the fan motor 51 reaches a normal rotational state (i.e., a state in which the position estimation operation has become possible), the sensorless control circuit 28 continuously generates the voltage command value Vpwm in such a way that the frequency or voltage value of the drive voltages SU1, SV1, and SW1 also becomes larger over time.

(2-9) Microcomputer

As shown in FIG. 1, the microcomputer 29 is mainly connected to the sensorless control circuit 28. Furthermore, although it is not illustrated in the drawings, the microcomputer 29 is also connected to an outdoor unit-side control unit that collectively controls the devices of the outdoor unit 10.

For example, the microcomputer 29 monitors the rotational speed of the fan motor 51 after startup begins (in other words, the second rotational speed signal FG2) and outputs to the sensorless control circuit 28 operation commands including a rotational speed command startup command and the rotational speed command Vfg.

(3) Actions

Figure 7:
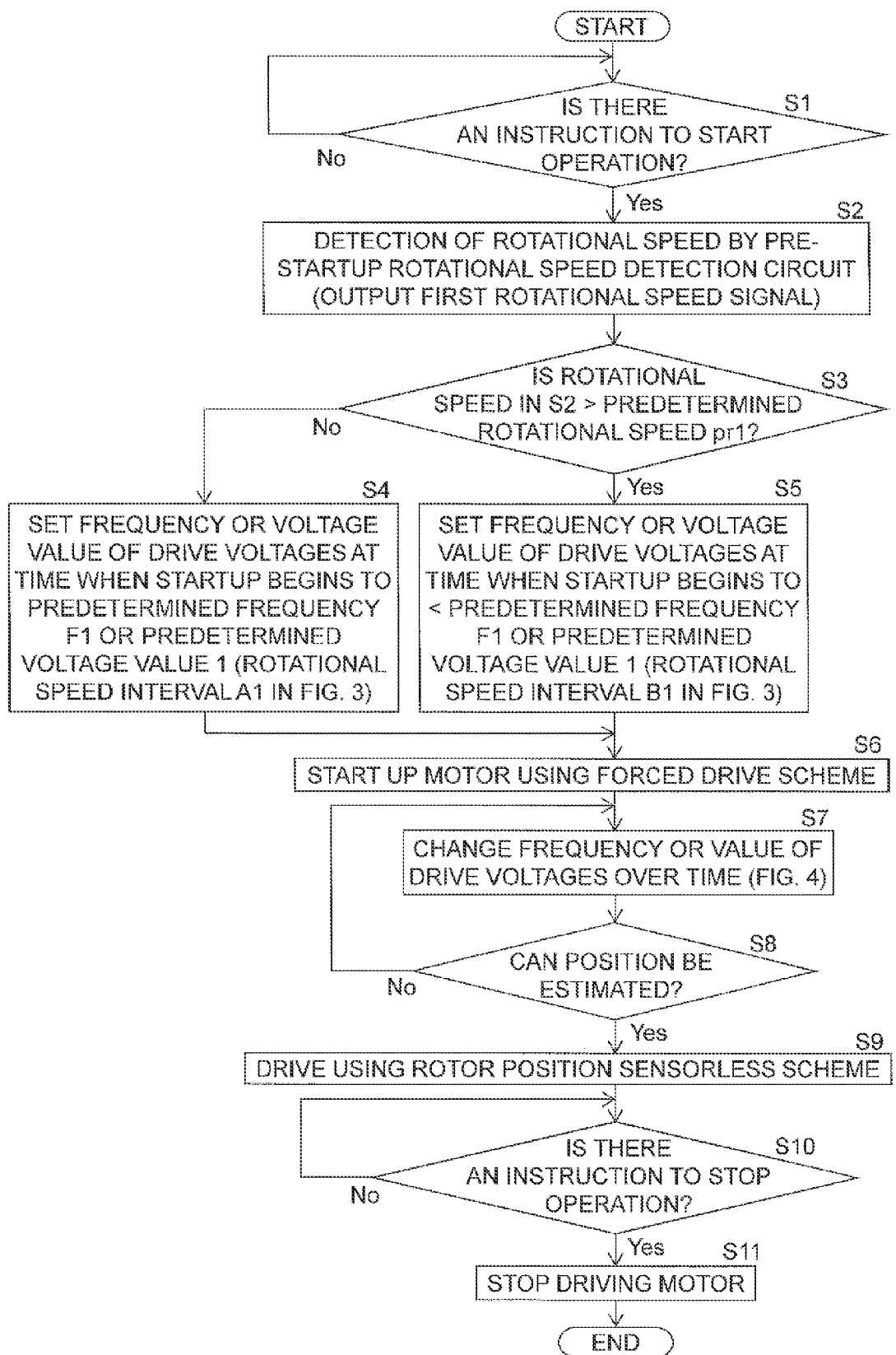
FIG. 7 is a flowchart for describing the actions of the motor drive control device pertaining to the first embodiment.

Next, the actions of the motor drive control device 20 of the present embodiment will be described using FIG. 7. FIG. 7 is a flowchart showing the actions that the motor drive control device 20 performs.

Steps S1 and S2: In a case where the microcomputer 29 has acquired an instruction to start the operation of the outdoor fan 15 from the outdoor unit-side control unit of the outdoor unit 10 (Yes in S1), the pre-startup rotational speed detection circuit 27 detects the rotational speed of the fan motor 51 at the current point in time before startup (S2). Because of this, the first rotational speed signal FG1 indicating the rotational speed of the fan motor 51 before startup is input to the sensorless control circuit 28.

Step S3: The sensorless control circuit 28 compares the rotational speed in step S2 with the predetermined rotational speed pr1.

Step S4: In step S3, in a case where the rotational speed in step S2 (i.e., the rotational speed of the fan motor 51 before startup) is smaller than the predetermined rotational speed pr1 (No in S3), as shown in rotational speed interval A1 in FIG. 3, the sensorless control circuit 28 sets the frequency (or voltage value) Vstart1 of the drive voltages SU1, SV1, and SW1 for causing the fan motor 51 to begin to start up to the predetermined frequency F1 (or the predetermined voltage value V1).

Step S5: In step S3, in a case where the rotational speed in step S2 (i.e., the rotational speed of the fan motor 51 before startup) is larger than the predetermined rotational speed pr1 (Yes in S3), as shown in rotational speed interval B1 in FIG. 3, the sensorless control circuit 28 sets the frequency (or voltage value) Vstart1 of the drive voltages SU1, SV1, and SW1 for causing the fan motor 51 to begin to start up to a smaller frequency (or voltage value) than the predetermined frequency F1 (or predetermined voltage value V1).

Step S6: The voltage command value Vpwm indicating the frequency or voltage value Vstart1 that was set in step S4 or S5 is input to the gate drive circuit 26, and the drive voltages SU1, SV1, and SW1 having the frequency or voltage value that was set in step S4 or S5 are output from the inverter 25 to the fan motor 51. The drive voltages SU1, SV1, and SW1 are voltages for starting up the fan motor 51 using the forced drive scheme, and because of this, the fan motor 51 begins to start up.

Step S7: As shown in FIG. 4, the sensorless control circuit 28 changes the frequency or voltage value of the drive voltages SU1, SV1, and SW1 over time. Because of this, the drive voltages SU1, SV1, and SW1 having a continuously changing frequency or voltage value are output from the inverter 25 to the fan motor 51.

Steps S8 and S9: Before long, when the sensorless control circuit 28 becomes able to estimate the rotational speed of the fan motor 51, or in other words the position of the rotor 53 (Yes in S8), the motor drive control device 20 judges that the fan motor 51 has reached a normal rotational state (S9). In a case where the fan motor 51 has reached a normal rotational state, the fan motor 51 is driven and controlled using the rotor position sensorless scheme. In step S8, in a case where the sensorless control circuit 28 cannot estimate the rotational speed of the fan motor 51 (No in S8), the motor drive control device 20 repeats the actions from step S7 on.

Steps S10 and S11: The motor drive control device 20 continuously performs rotor position sensorless driving with respect to the fan motor 51 until the microcomputer 29 acquires an instruction to stop driving the outdoor fan 15 (No in S10). In a case where the microcomputer 29 has acquired an instruction to stop driving the outdoor fan 15 (Yes in S10), the output of the drive voltages SU1, SV1, and SW1 to the fan motor 51 by the inverter 25 is stopped and the fan motor 51 stops being driven (S11).

(4) Characteristics
(4-1)

In the motor drive control device 20 pertaining to the present embodiment, the drive voltages SU1, SV1, and SW1 based on the forced drive scheme are changed at least at the time of a state just before startup of the fan motor 51. That is, the drive voltages SU1, SV1, and SW1 based on the forced drive scheme that are output to the fan motor 51 in order to start up the fan motor 51 change in accordance with the rotational state of the fan motor 51. Because of this, the fan motor 51 is started up by the drive voltages SU1, SV1, and SW1 corresponding to the rotational state of the fan motor 51 at least at the time of a state just before motor startup, so the occurrence of an overcurrent and overvoltage condition can be suppressed, and the startup stability of the fan motor 51 can be ensured simply and without incurring costs.

(4-2)

In particular, in the present embodiment, when outputting the drive voltages SU1, SV1, and SW1 based on the forced drive scheme to the fan motor 51 to start up the fan motor 51, the sensorless control circuit 28 changes the frequency or voltage value of the drive voltages SU1, SV1, and SW1 in accordance with the rotational speed just before startup of the fan motor 51. Because of this, the fan motor 51 can reliably start up even when the forced drive scheme is employed.

(4-3)

Furthermore, according to the present embodiment, as shown in FIG. 4 for example, during the period of time from when the fan motor 51 begins to start up to until the fan motor 51 reaches a normal rotational state, the drive voltages SU1, SV1, and SW1 whose frequency or voltage value changes each moment over time, or in other words in accordance with the rotational state of the fan motor 51, are output to the fan motor 51. Consequently, the occurrence of an overcurrent and an overvoltage is more reliably suppressed.

(4-4)

Furthermore, according to the present embodiment, as shown in FIG. 3 for example, in a case where the rotational speed of the fan motor 51 at the time just before startup is equal to or greater than the predetermined rotational speed pr1, the frequency (or voltage value) Vstart1 of the drive voltages SU1, SV1, and SW1 that are output to the fan motor 51 in order to cause the fan motor 51 to begin to start up is set smaller than the predetermined frequency F1 (or predetermined voltage value V1). Because of this, the motor drive control device 20 can suppress the phenomenon where the motor current Im flowing in the fan motor 51 and the voltage of the smoothing capacitor 22 become excessive when the fan motor 51 that is already rotating at a rotational speed equal to or greater than the predetermined rotational speed pr1 at the time just before startup has been started up, and can ensure the startup stability of the fan motor 51.

(4-5)

According to the present embodiment, the frequency or voltage value of the drive voltages SU1, SV1, and SW1 is set to become larger in accompaniment with the increase in the rotational speed of the fan motor 51 during the period of time from when the fan motor 51 begins to start up to until the fan motor 51 reaches a normal rotational state. Because of this, the phenomenon where the motor current Im flowing in the fan. motor 51 and the voltage of the smoothing capacitor 22 become excessive as well as a loss of synchronism of the fan motor 51 can be suppressed, and the startup stability of the fan motor 51 can be ensured.

(4-6)

In particular, in the present embodiment, during the period of time from when the fan motor 51 begins to start up to until the fan motor 51 reaches a normal rotational state, the frequency or voltage value of the drive voltages is set to become larger in accompaniment with elapsed time after startup begins. Because of this, the phenomenon where the motor current Im flowing in the fan motor 51 and the voltage of the smoothing capacitor 22 become excessive as well as a loss of synchronism of the fan motor 51 can be suppressed, and the startup stability of the fan motor 51 can be ensured.

<Second Embodiment>

In the above embodiment, a case was described where the fan motor 51 is started up using the so-called forced drive scheme. Here, a case will be described where, in order to make startup more reliable, the fan motor 51 is started up using a direct-current excitation scheme at the time when startup begins.

(1) Configuration

Figure 8:
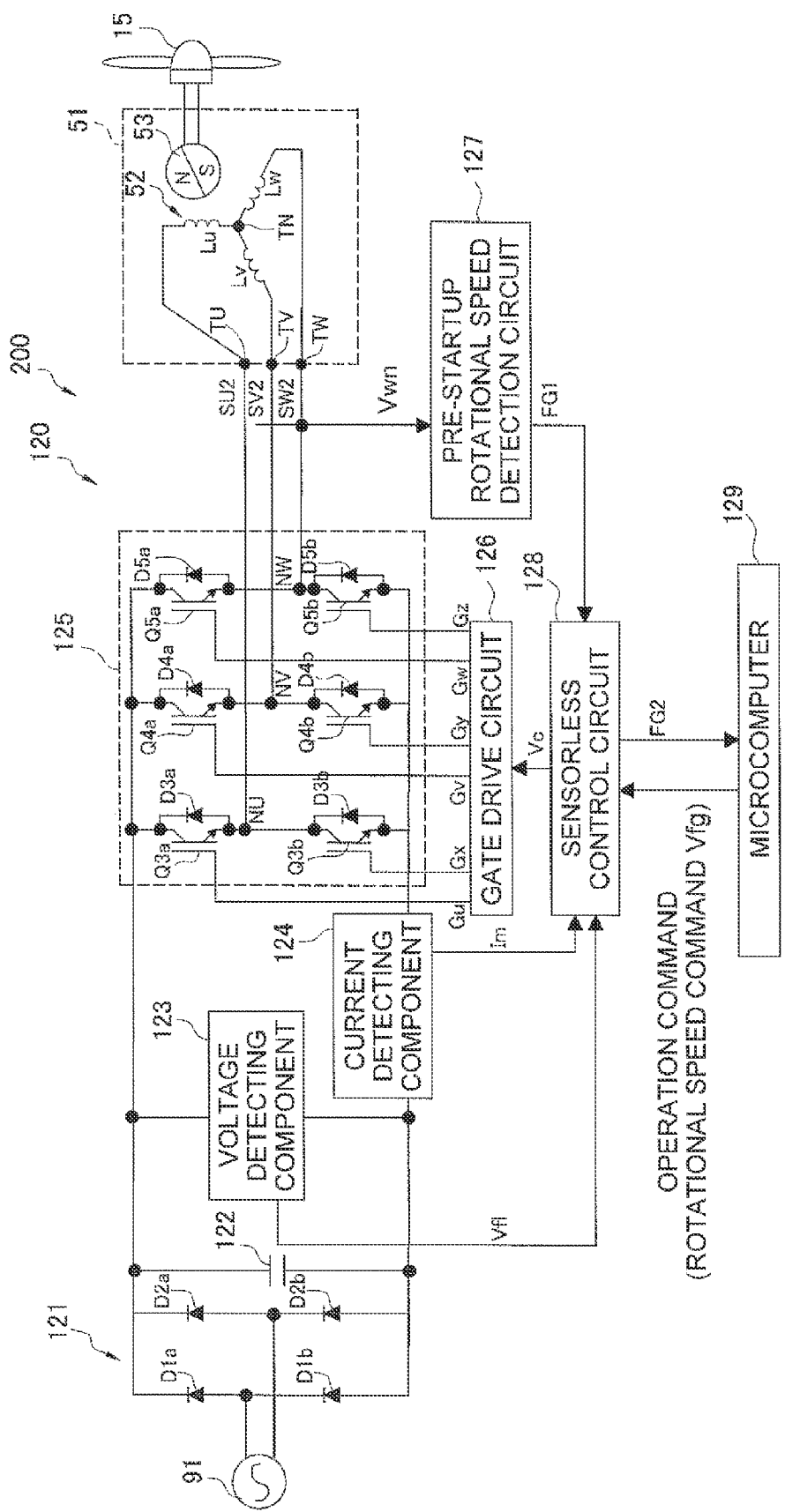
FIG. 8 is a block diagram showing the overall configuration of a system in which a motor drive control device pertaining to a second embodiment is employed and the internal configuration of the motor drive control device.

FIG. 8 is a configuration diagram showing an entire motor drive control system 200 that includes a motor drive control device 120 pertaining to the present embodiment. The motor drive control device 120 shown in FIG. 8 has the same configuration as that of the motor drive control device 20 pertaining to the first embodiment, but some of the control it performs is different from that of the motor drive control device 20 pertaining to the first embodiment.

That is, the motor drive control device 120 is equipped with a rectifying component 121, a smoothing capacitor 122, a voltage detecting component 123, a current detecting component 124, an inverter (which corresponds to a startup component) 125, a gate drive circuit 126, a pre-startup rotational speed detection circuit (which, together with the rotational speed estimating component 28c of a sensorless control circuit 128, corresponds to a rotational speed deriving component) 127, a sensorless control circuit 128 (which mainly corresponds to a changing component), and a microcomputer 129.

The rectifying component 121, the smoothing capacitor 122, the voltage detecting component 123, the current detecting component 124, the gate drive circuit 126, the pre-startup rotational speed detection circuit 127, and the microcomputer 129 are the same as the rectifying component 21, the smoothing capacitor 22, the voltage detecting component 23, the current detecting component 24, the gate drive circuit 26, the pre-startup rotational speed detecting component 27, and the microcomputer 29, respectively, to which the same names are assigned in FIG. 1. For that reason, below, description of these functional components will be omitted, and just those parts where the inverter 125 and the sensorless control circuit 128 differ from the inverter 25 and the sensorless control circuit 28 pertaining to the first embodiment will be described.

(1-1) Inverter

When starting up the fan motor 51, the inverter 125 pertaining to the present embodiment starts up the motor 51 by outputting to the fan motor 51 drive voltages SU2, SV2, and SW2 based on a direct-current excitation scheme to fix the motor 51 and thereafter performing drive control. Here, the direct-current excitation scheme is a scheme that temporarily fixes the position of the rotor 53 of the motor 51 in a predetermined position by performing direct-current energization using a predetermined energization pattern with respect to the fan motor 51 just before startup and starts driving the fan motor 51 from the state in which the rotor 53 is fixed. Because of this, the drive voltages SU2, SV2, and SW2 for exciting the rotor 53 with direct current and moving the position of the rotor 53 to, and fixing the position of the rotor 53 in, the predetermined position are output from the inverter 125 to the fan motor 51. Next, the drive voltages SU2, SV2, and SW2 for forcibly driving the rotor 53 are output from the inverter 125 to the fan motor 51. Because of this forced driving, the fan motor 51 can finally start up.

Here, the "predetermined position" is appropriately decided to be an arbitrary position fixed beforehand by a predetermined energization pattern, such as an electrical angle of "210 degrees" for example.

In particular, the inverter 125 pertaining to the present embodiment causes the fan motor 51 to start up using the drive voltages SU2, SV2, and SW2 in the direct-current excitation scheme that have a duty or modulation factor corresponding to the rotational speed of the fan motor 51 just before startup. Additionally, during the period of time until the drive scheme moves to forced energization after startup of the fan motor 51 begins, the inverter 25 outputs to the fan motor 51 the drive voltages SU2, SV2, and SW2 in the direct-current excitation scheme that have a duty (or modulation factor or voltage value; the same is true below) corresponding to the rotational speed of the fan motor 51 during startup.

That is, when the conventional direct-current excitation scheme had been used to start up the fan motor 51, the inverter had output drive voltages having no relation to the rotational speed of the fan motor 51, or in other words drive voltages having a fixed duty. However, in the present embodiment, when starting up the fan motor 51 using the direct-current excitation scheme, the drive voltages SU2, SV2, and SW2 having a duty corresponding to the actual rotational speed are output to the fan motor 51.

"During startup" means the period of time from when the fan motor 51 begins to start-up to until the fan motor 51 reaches a normal rotational state.

The sensorless control circuit 128 pertaining to the present embodiment changes, in accordance with the rotational speed of the fan motor 51 just before startup, a duty Vstart2 (see FIG. 9) of the drive voltages SU2, SV2, and SW2 based on the direct-current excitation scheme that are output to the fan motor 51 in order to cause the fan motor 51 to begin to start up. That is, the duty Vstart2 of the drive voltages SU2, SV2, and SW2 at the time when startup of the fan motor 51 begins is defined by the actual rotational speed of the fan motor 51 before actually starting up the motor 51. As the rotational speed of the fan motor 51 just before startup, the detection result of the pre-startup rotational speed detection circuit 127 is used.

Figure 9:
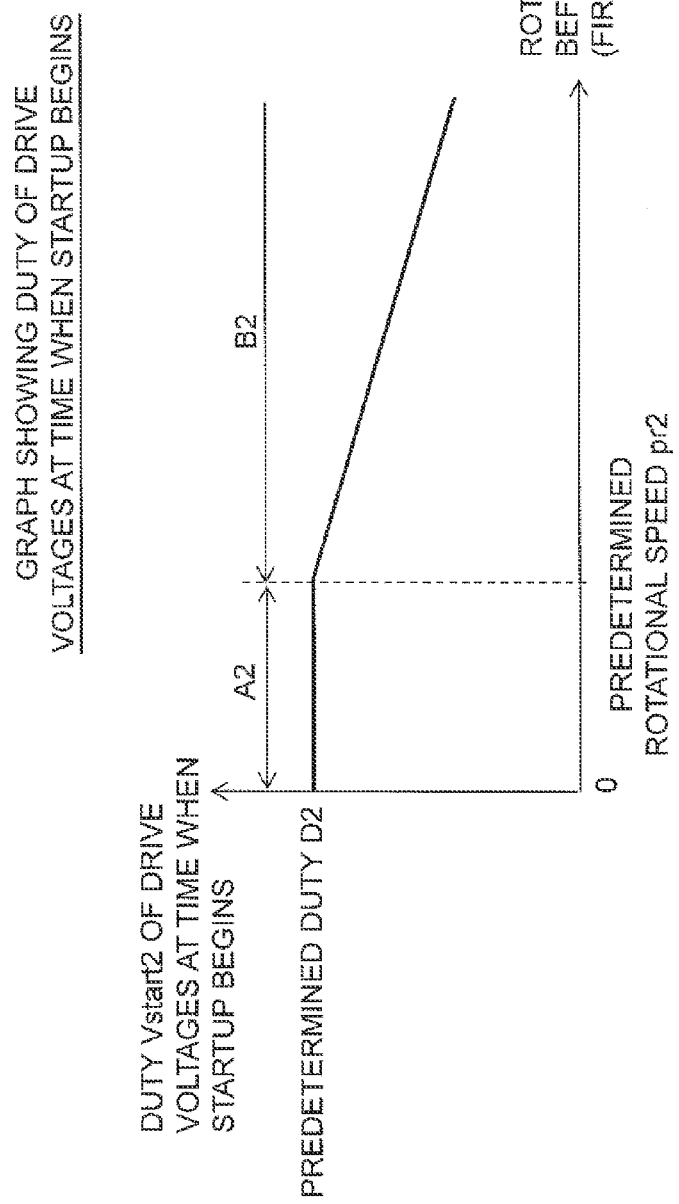
FIG. 9 is a graph conceptually showing the relationship between the rotational speed of the fan motor just before startup begins and the duty of the drive voltages at the time when startup begins.

FIG. 9 is a graph showing, as a concept, the duty Vstart2 of the drive voltages SU2, SV2, and SW2 at the time when startup begins with respect to the rotational speed of the fan motor 51 just before startup. In FIG. 9, the horizontal axis shows the rotational speed of the fan motor 51 just before startup begins (i.e., the rotational speed that has been detected by the pre-startup rotational speed detection circuit 127; the first rotational speed signal FG), and the vertical axis shows the duty Vstart2 of the drive voltages SU2, SV2, and SW2 that are output to the fan motor 51 at the time when startup begins. As shown in rotational speed interval A2 in FIG. 9, in a case where the rotational speed of the fan motor 51 just before startup begins is smaller than a predetermined rotational speed pr2, the duty Vstart2 of the drive voltages SU2, SV2, and SW2 is set to a predetermined duty D2. However, as shown in rotational speed interval B2 in FIG. 9, in a case where the rotational speed of the fan motor 51 just before startup begins is larger than the predetermined rotational speed pr2, the duty Vstart2 of the drive voltages SU2, SV2, and SW2 is set to a smaller duty than the predetermined duty D2 in order to suppress the current flowing due to the rotation of the motor.

Here, the predetermined duty D2 is the duty of the drive voltages that are output to the fan motor 51 in a case where the motor 51 begins to start up in a non-rotating state. The duty of the predetermined rotational speed pr2 and the duty with respect to a rotational speed equal to or greater than pr2 are set to appropriate values beforehand by desktop calculation, simulation, or experiment on the basis of the characteristics of the fan motor 51, the outdoor fan 15, and the evaporator 14.

That is, in the present embodiment, in a case where the fan motor 51 that is not yet being driven is already rotating a certain extent due to the effect of an external force or inertial force just after rotation has been stopped, the sensorless control circuit 128 generates a voltage command value Vc that reduces the duty Vstart2 of the drive voltages SU2, SV2, and SW2 that are output to the fan motor 51 in order to cause the fan motor 51 to begin to start up.

Figure 10:
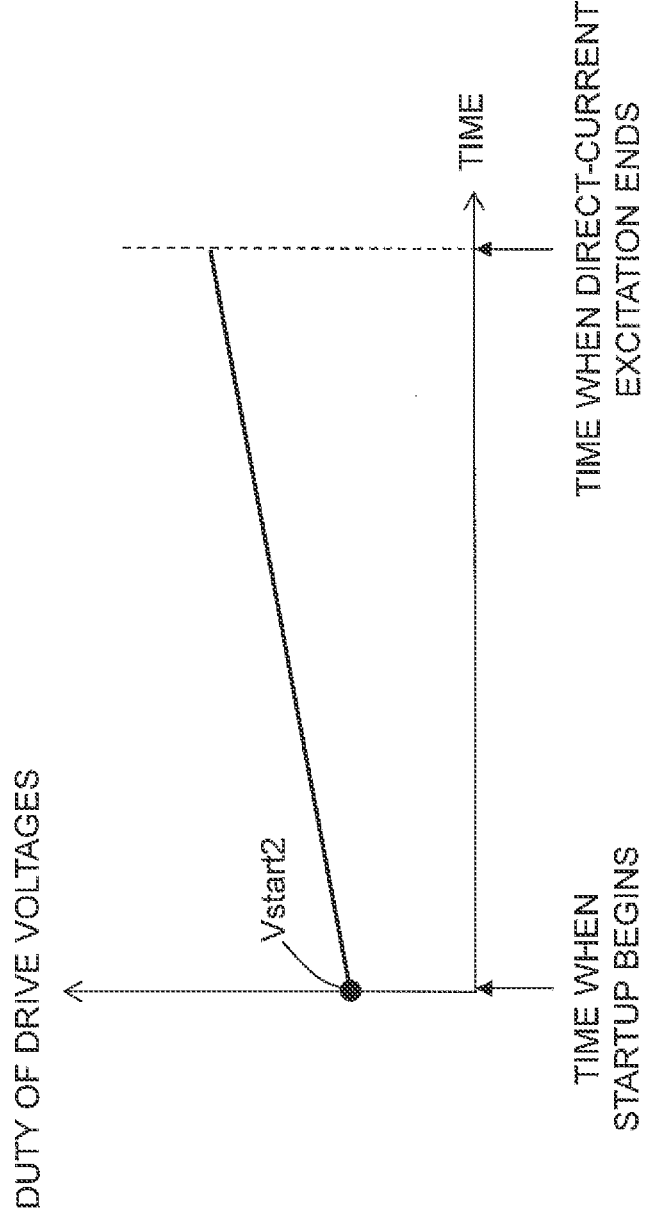
FIG. 10 is a graph conceptually showing, as an example, a temporal change in the duty of the drive voltages from just after startup of the fan motor begins to until direct-current excitation ends.

FIG. 10 is a graph conceptually showing a temporal change in the duty of the drive voltages SU2, SV2, and SW2 that are output to the fan motor 51 during the period of time from just after startup of the fan motor 51 begins to until direct-current excitation ends. In FIG. 10, the horizontal axis shows time and the vertical axis shows the duty of the drive voltages SU2, SV2, and SW2. As shown in FIG. 10, during the period of time from just after startup of the fan motor 51 begins to until direct-current excitation ends, the inverter 125 outputs to the fan motor 51 the drive voltages SU2, SV2, and SW2 whose duty continually becomes larger over time. At this time, because it is the case that fixed power resulting from direct-current excitation is applied to the rotating fan motor 51, the rotational speed of the fan motor 51 decreases over time from just after startup begins. For that reason, it can be said of the above-described action that the Inverter 125 continuously changes the duty in accompaniment with the change in the rotational speed.

After direct-current excitation ends, forced energization is performed with respect to the fan motor 51, so that the rotational speed of the fan motor 51 rises to a predetermined rotational speed. Then, thereafter the control scheme with respect to the fan motor 51 is moved to rotor position sensorless control. In the rotor position sensorless control from the forced energization performed after direct-current excitation ends, a startup method using the forced drive scheme described in the first embodiment is employed. Consequently, here, description of the control (in other words, the forced drive scheme) performed after direct-current excitation ends will be omitted.

As described above, during the period of time from just before startup of the fan motor 51 to until the fan motor 51 reaches a normal rotational state, the inverter 125 pertaining to the present embodiment outputs to the fan motor 51 the drive voltages SU2, SV2, and SW2 in the direct-current excitation scheme that have a duty corresponding to the actual rotational speed of the fan motor 51. Because of this, compared to a startup action resulting from the conventional direct-current excitation scheme that uses fixed drive voltages to start up the fan motor 51 that is already rotating due to the effect of an external force such as wind or inertial force just after rotation has been stopped, it becomes difficult for an overcurrent condition and an overvoltage condition and a condition where there is a loss of synchronism of the motor to occur. For that reason, the fan motor 51 can stably start up.

In other words, if the fan motor 51 is already rotating due to the effect of an. external force such as wind or inertial force just after rotation has been stopped, the voltage induced to the fan motor 51 rises because of that rotation. In this state, if drive voltages having a fixed duty are applied to the fan motor 51 using the direct-current excitation scheme regardless of the actual rotational speed of the fan motor 51, a motor current and voltage based on the drive voltages having the fixed duty become added to the voltage already being induced to the motor 51 because the drive voltages are voltages having a duty assumed to fix the fan motor 51 originally in a non-rotating state. When this happens, the result is that an overcurrent and an overvoltage are caused. However, in the present embodiment, although the fan motor 51 is started up using the direct-current excitation scheme, the drive voltages SU2, SV2, and SW2 in this case are drive voltages having a duty taking into consideration the actual rotational speed of the fan motor 51. For that reason, the values of the motor current and voltage based on the drive voltages SU2, SV2, and SW2 become appropriate values corresponding to the rotational speed at each moment of the fan motor 51, and it becomes difficult for an overcurrent and an overvoltage to occur.

How long of a time period the direct-current excitation is performed is set to an appropriate value beforehand by desktop calculation, simulation, or experiment on the basis of the characteristics of the fan motor 51, the outdoor fan 15, and the evaporator 14.

(1-2) Sensorless Control Circuit

The sensorless control circuit 128 has the same configuration as that of the sensorless control circuit 28 pertaining to the first embodiment (see FIG. 6), and is a circuit that uses the rotor position sensorless scheme to drive the fan motor 51. During the period of time from when the fan motor 51 begins to start up to until the fan motor 51 reaches a normal rotational state and during the period of time while the fan motor 51 is normally rotating, the sensorless control circuit 128 performs an estimation of the position of the rotor 53 and an estimation of the rotational speed of the fan motor 51 and outputs the voltage command value Vc corresponding to the results of these estimations.

In particular, as shown in FIG. 10, during the period of time from just after startup of the fan motor 51 begins to until direct-current excitation ends, the sensorless control circuit 128 continuously generates the voltage command value Vc in such a way that the duty of the drive voltages SU2, SV2, and SW2 becomes larger over time. Furthermore, because fixed power resulting from direct-current excitation is applied to the rotating fan motor 51, the rotational speed of the fan motor 51 decreases over time from just after startup begins. For that reason, if can be said that the sensorless control circuit 128 continuously generates the voltage command value Vc in accompaniment with the change in the rotational speed.

(2) Actions

Figure 11:
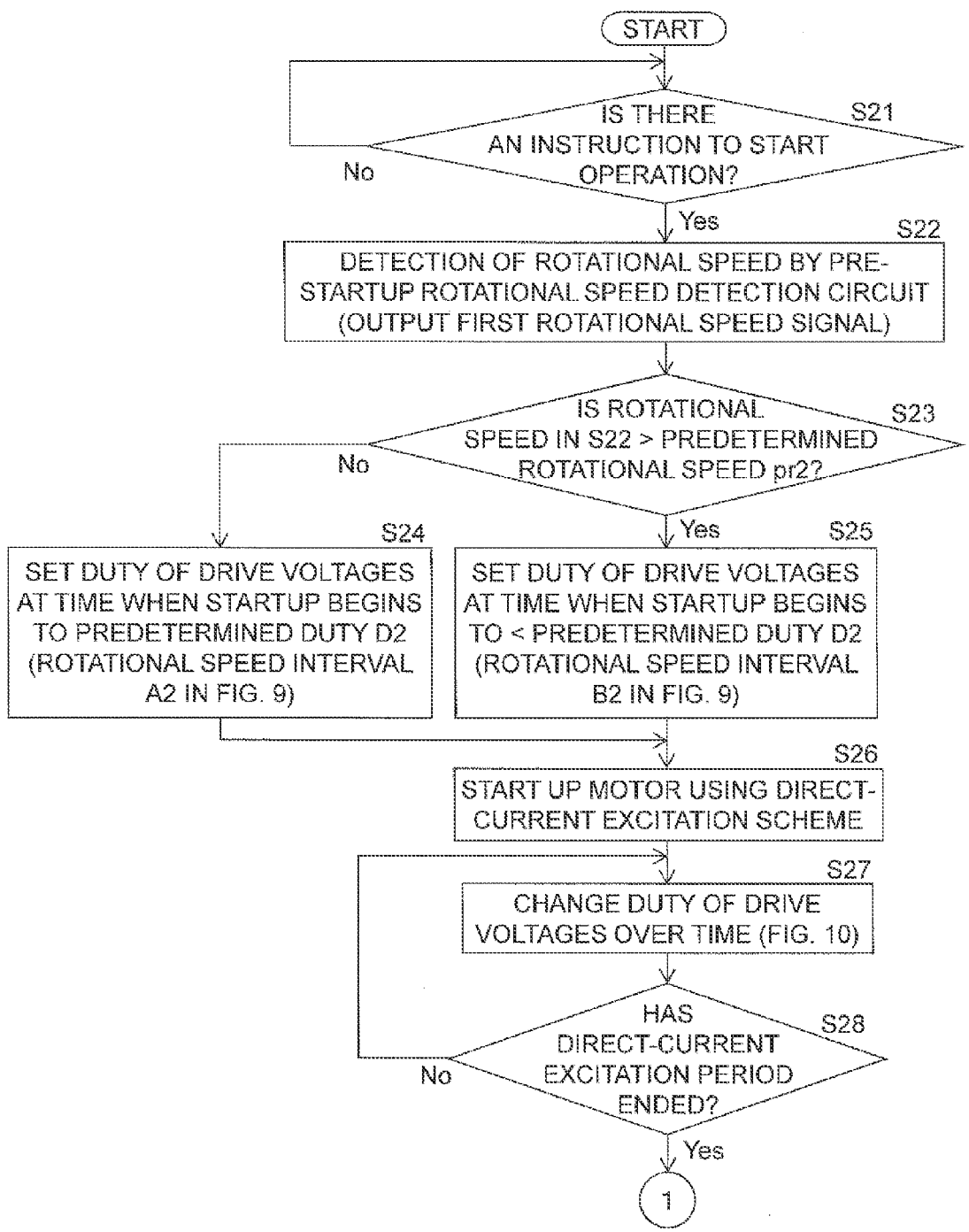
FIG. 11 is a flowchart for describing the actions of the motor drive control device pertaining to the second embodiment.
Figure 12:
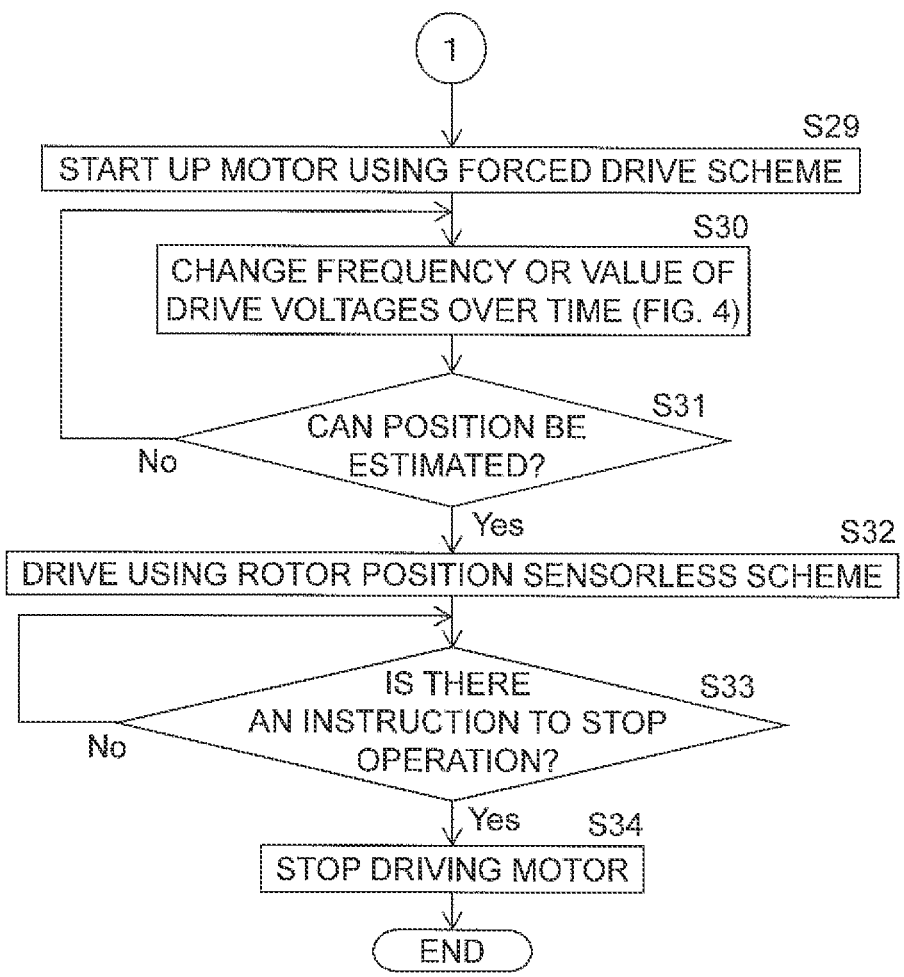
FIG. 12 is a flowchart for describing the actions of the motor drive control device pertaining to the second embodiment.

Next, the actions of the motor drive control device 120 of the present embodiment will be described using FIGS. 11 and 12. FIGS. 11 and 12 are flowcharts showing the actions that the motor drive control device 120 performs.

Steps S21 and S22: In a case where the microcomputer 129 has acquired an instruction to start the operation of the outdoor fan 15 from the outdoor unit-side control unit of the outdoor unit 10 (Yes in S21), the pre-startup rotational speed detection circuit 127 detects the rotational speed of the fan motor 51 at the current point in time before startup (S22). Because of this, the first rotational speed signal FG1 indicating the rotational speed of the fan motor 51 before startup is input to the sensorless control circuit 128.

Step S23: The sensorless control circuit 128 compares the rotational speed in step S22 with the predetermined rotational speed pr2.

Step S24: In step S23, in a case where the rotational speed in step S22 (i.e., the rotational speed of the fan motor 51 before startup; the first rotational speed signal FG1) is smaller than the predetermined rotational speed pr2 (No in S23), as shown in rotational speed interval A2 in FIG. 9, the sensorless control circuit 128 sets the duty Vstart2 of the drive voltages SU2, SV2, and SW2 for causing the fan motor 51 to begin to start up to the predetermined duty D2.

Step S25: In step S23, in a case where the rotational speed in step S22 (i.e., the rotational speed of the fan motor 51 before startup; the first rotational speed signal FG1) is larger than the predetermined rotational speed pr2 (Yes in S23), as shown in rotational speed interval B2 in FIG. 9, the sensorless control circuit 128 sets the duty Vstart2 of the drive voltages SU2, SV2, and SW2 for causing the fan motor 51 to begin to start up to a smaller duty than the predetermined duty D2.

Step S26: The voltage command value Vc indicating the duty that was set in step S24 or S25 is input to the gate drive circuit 126, and the drive voltages SU2, SV2, and SW2 having the duty that was set in step S24 or S25 are output from the inverter 125 to the fan motor 51. The drive voltages SU2, SV2, and SW2 are voltages for fixing the fan motor 51 using the direct-current excitation scheme, and because of this, the fan motor 51 begins to start up.

Step S27: As shown in FIG. 10, the sensorless control circuit 128 continuously generates the voltage command value Vc in such a way that the duty of the drive voltages SU2, SV2, and SW2 becomes larger over time. That is, the sensorless control circuit 128 continuously generates the voltage command value Vc in accompaniment with the change in the rotational speed. Because of this, the drive voltages SU2, SV2, and SW2 whose duty gradually becomes larger are output from the inverter 125 to the fan motor 51.

Steps S28 and S29: When the direct-current excitation period ends (Yes in S28), the startup scheme moves from the direct-current excitation scheme to the forced drive scheme (S29). The voltage command value Vc indicating the predetermined frequency or voltage value is input to the gate drive circuit 126, and the drive voltages SU2, SV2, and SW2 having that frequency or voltage value are output from the inverter 125 to the fan motor 51. In other words, the drive voltages SU2, SV2, and SW2 are voltages for starting up the fan motor 51 using the forced drive scheme, and because of this, the fan motor 51 begins to start up. The actions from step S27 on are repeated until the direct-current excitation period ends in step S28 (No in S28).

Step S30: As shown in FIG. 4 pertaining to the first embodiment, the sensorless control circuit 128 changes the frequency or voltage value of the drive voltages SU2, SV2, and SW2 based on the forced drive scheme over time. Because of this, the drive voltages SU2, SV2, and SW2 having a continuously changing frequency or voltage value are output from the inverter 125 to the fan motor 51.

Steps S31 and S32: Before long, when the sensorless control circuit 128 becomes able to estimate the rotational speed of the fan motor 51, or in other words the position of the rotor 53 (Yes in S31), the motor drive control device 120 judges that the fan motor 51 has reached a normal rotational state (S32). In a case where the fan motor 51 has reached a normal rotational state, the fan motor 51 is driven and controlled by the rotor position sensorless scheme. In step S31, in a case where the sensorless control circuit 128 cannot estimate the rotational speed of the fan motor 51 (No in S31), the motor drive control device 120 repeats the actions from step S30 on.

Steps S33 and S34: The motor drive control device 120 continuously performs rotor position sensorless driving with respect to the fan motor 51 until the microcomputer 129 acquires an instruction to stop driving the outdoor fan 15 (No in S33). In a case where the microcomputer 129 has acquired an instruction to stop driving the outdoor fan 15 (Yes in S33), the output of the drive voltages SU2, SV2, and SW2 to the fan motor 51 by the inverter 125 is stopped and the fan motor 51 stops being driven (S34).

(3) Characteristics (3-1)

In the motor drive control device 120 pertaining to the present embodiment, the drive voltages SU2, SV2, and SW2 based on the direct-current excitation scheme are changed in accordance with the rotational state of the fan motor 51 from a state just before startup of the fan motor 51 to until direct-current excitation ends. Additionally, during the period of time from after direct-current excitation ends to until the fan motor 51 reaches a normal rotational state, the drive voltages SU2, SV2, and SW2 based on the forced drive scheme are changed in accordance with the rotational state of the fan motor 51. That is, the drive voltages SU2, SV2, and SW2 that are output to the fan motor 51 in order to start up the fan motor 51 are not fixed but change in accordance with the rotational speed of the fan motor 51. Because of this, the fan motor 51 is started up by the drive voltages SU2, SV2, and SW2 corresponding to the rotational speed of the fan motor 51, so the occurrence of an overcurrent and overvoltage condition can be suppressed, and the startup stability of the fan motor 51 can be ensured simply and without incurring costs.

(3-2)

In particular, in the present embodiment, when outputting the drive voltages SU2, SV2, and SW2 based on the direct-current excitation scheme to the fan motor 51 to start up the fan motor 51, the sensorless control circuit 128 changes the duty of the drive voltages SU2, SV2, and SW2 in accordance with the rotational speed just before startup of the fan motor 51. Because of this, the fan motor 51 can reliably start up even when the direct-current excitation scheme is employed.

(3-3)

Furthermore, according to the present embodiment, as shown in FIG. 10 for example, during the period of time from when the fan motor 51 begins to start up until direct-current excitation ends, the drive voltages SU2, SV2, and SW2 having a duty that changes each moment over time, or in other words in accordance with the rotational speed of the fan motor 51, are output to the fan motor 51. Consequently, the occurrence of an overcurrent and an overvoltage is more reliably suppressed.

(3-4)

Depending on the case, sometimes the fan motor 51 is already rotating at the time just before startup due to the effect of an external force such as wind or inertial force just after rotation has been stopped, and the rotational speed of the motor 51 is equal to or greater than the predetermined rotational speed pr2. However, as shown in FIG. 9 for example, in a case where the rotational speed of the fan motor 51 at the time just before startup is equal to or greater than the predetermined rotational speed pr2, the motor drive control device 120 pertaining to the present embodiment makes the duty Vstart2 of the drive voltages SU2, SV2, and SW2 that are output to the fan motor 51 in order to cause the fan motor 51 to begin to start up smaller than the predetermined duty D2 of the predetermined drive voltages. Because of this, the motor drive control device 120 can suppress the phenomenon where the motor current Im flowing in the fan motor 51 and the voltage of the smoothing capacitor 22 become excessive when the fan motor 51 that is already rotating at a rotational speed equal to or greater than the predetermined rotational speed pr2 at the time just before startup has been started up, and can ensure the startup stability of the fan motor 51.

(3-5)

The motor drive control device 120 pertaining to the present embodiment makes the duty of the drive voltages SU2, SV2, and SW2 larger in accompaniment with the drop in the rotational speed of the fan motor 51 during the period of time from when the fan motor 51 begins to start up to until the fan motor 51 reaches a normal rotational state. Because of this, the phenomenon where the motor current Im flowing in the fan motor 51 and the voltage of the smoothing capacitor 22 become excessive as well as a loss of synchronism of the fan motor 51 can be suppressed, and the startup stability of the fan motor 51 can be ensured.

(3-6)

In particular, in the present embodiment, during the period of time from when the fan motor 51 begins to start up to until the fan motor 51 reaches a normal rotational state, the frequency or voltage value of the drive voltages is set to become larger in accompaniment with elapsed time after startup begins. Because of this, the phenomenon where the motor current Im flowing in the fan motor 51 and the voltage of the smoothing capacitor 22 become excessive as well as a loss of synchronism of the fan motor 51 can be suppressed, and the startup stability of the fan motor 51 can be ensured.

<Example Modifications>

Embodiments of the present invention and example modifications thereof have been described above on the basis of the drawings, but the specific configurations thereof are not limited to these embodiments and their example modifications and can be changed without departing from the spirit of the invention.

(1) Example Modification A

In the first and second embodiments, a case was described where, as the technique for grasping the rotational speed of the fan motor 51 at the time just before startup, a technique that detects the rotational speed of the fan motor 51 at the time of startup on the basis of the W-phase inductive voltage Vwn was employed.

However, the technique for grasping the rotational speed of the fan motor 51 at the time just before startup is not limited to the technique pertaining to the first and second embodiments, and any technique may be employed provided that it is a technique that can derive the rotational speed of the fan motor 51 at the time of startup.

Examples of other techniques for deriving the rotational speed of the fan motor 51 at the time of startup include the following.

(Technique 1) A technique by which the rotational speed of the fan motor 51 is grasped using a predetermined mathematical model relating to the control of the fan motor 51.

(Technique 2) A technique by which the rotational speed of the fan motor 51 is grasped on the basis of the smoothed voltage Vfl detected by the voltage detecting component 23 or 123.

(Technique 3) A technique by which the rotational speed of the fan motor 51 is grasped on the basis of the motor current Im detected by the current detecting component 24 or 124.

Regarding technique 2, the smoothed voltage Vfl becomes a value directly indicating the rotational speed of the fan motor 51 particularly in a case where the supply of power from the commercial power supply 91 has been cut off (not illustrated in the drawings), and consequently the smoothed voltage Vfl tends to become larger the larger the rotational speed of the fan motor 51 before startup is. For that reason, it becomes possible to grasp the rotational speed of the fan motor 51 on the basis of the smoothed voltage Vfl.

Likewise, regarding technique 3, the motor current Im tends to become larger the larger the rotational speed of the fan motor 51 before startup is. For that reason, it becomes possible to grasp the rotational speed of the fan motor 51 on the basis of the motor current Im.

Furthermore, in a case where a technique for grasping the rotational speed on the basis of inductive voltage is employed, the rotational speed of the fan motor 51 may also be detected further using the inductive voltage generated in the U-phase and/or the V-phase and not just the W-phase. Because of this, a more accurate grasp of the rotational speed becomes possible.

(2) Example Modification B

FIGS. 4 and 10 pertaining to the first and second embodiments show a case where the duty, frequency, and voltage value of the drive voltages SU1 to SW1 and SU2 to SW2 become larger linearly over time. However, the duty, frequency, and voltage value of the drive voltages SU1 to SW1 and SU2 to SW2 may also increase curvilinearly, rather than linearly, over time.

Likewise, FIGS. 3 and 9 pertaining to the first and second embodiments show a case where the duty, frequency, and voltage value Vstart1 and Vstart2 of the drive voltages SU1 to SW1 and SU2 to SW2 are changed so as to become linearly smaller in a case where the rotational speed of the fan motor 51 just before startup begins is larger than the predetermined rotational speeds pr1 and pr2 (see rotational speed interval B1 in FIG. 3 and rotational speed interval B2 in FIG. 9). However, the duty, frequency, and voltage value Vstart1 and Vstart2 of the drive voltages SU1 to SW1 and SU2 to SW2 may also be changed curvilinearly in accordance with the rotational speed of the fan motor 51 just before startup begins.

(3) Example Modification C

In the first and second embodiments, a case was described where the motor drive control devices 20 and 120 pertaining to the present invention are used as devices for driving and controlling the fan motor 51 that is the drive source of the outdoor fan 15.

However, the intended use of the motor drive control device pertaining to the present invention is not only for the drive source of the outdoor fan 15, and the device may also be used as a device for driving and controlling a fan motor (not illustrated in. the drawings) that is a drive source for an indoor fan (not illustrated in the drawings). This is because in the case of an indoor fan, there are cases where there is an instruction to start up the indoor fan again just after an instruction to stop driving the indoor fan has been given by a user operating a remote controller, and the startup stability of the motor in this case is improved by the present invention.

(4) Example Modification D

In the first and second embodiments, a case was described where a brushless DC motor not equipped with a position detection sensor (e.g., a Hall element) that detects the position of the rotor 53 is utilized as the fan motor 51.

However, the motor serving as the drive target of the motor drive control device pertaining to the present invention may also be a motor equipped with a position detection sensor. In a case where the number of position detection sensors is small, such as one or two, there are cases where direct-current excitation and forced energization are performed with respect to the motor at the time of startup. The motor drive control device in this case can easily detect, with a position detection sensor, the rotational speed of the motor during startup by using a position detection sensor as the pre-startup rotational speed detection circuit 27 or 127 described in the first and second embodiments. For that reason, it suffices to change the output voltage and duty in accordance with the rotational speed detected by the position detection sensor.

Furthermore, likewise, in a case where the rotational speed of the motor from when the motor starts up to until the rotor position sensorless operation is performed can be acquired by a detection circuit or a case where the rotational speed of the motor is estimated by the passage of time since startup was begun, the motor drive control device can change the voltage value and duty of the drive voltages in accordance with that rotational speed.

For example, FIG. 9 of the direct-current excitation scheme described in the second embodiment shows duty with respect to the rotational speed of the motor just before startup, but by finding the duty value with respect to the rotational speed during startup (specifically, during direct-current excitation) like in this drawing and performing control, an overvoltage and an overcurrent during startup can be prevented more reliably.

(5) Example Modification E

In the first and second embodiments, a case was described where the voltage value and duty of the drive voltages SU1 to SW1 and SU2 to SW2 were adjusted as the drive signal. However, rather than adjusting the voltage value and the duty value, the motor current may also be adjusted as the drive signal. In the direct-current excitation scheme the fixed power of the motor is adjusted, and in the forced drive scheme the drive force (drive torque) of the motor is adjusted, so the same effects can be obtained even when the motor current is adjusted.

(6) Example Modification F

In the second embodiment, a case was described where, during the period of time from just before startup of the motor to until the motor reaches a normal rotational state, the direct-current excitation scheme is employed at the time when motor startup begins and then the forced drive system described in the first embodiment is employed. However, the motor may also be started up using just the direct-current excitation scheme and without the forced drive scheme being employed midway.

INDUSTRIAL APPLICABILITY

As described above, according to the present invention, the motor is started up by a drive signal corresponding to the rotational speed of the motor, so the startup stability of the motor can be ensured simply and without incurring costs. For that reason, the motor drive control device pertaining to the present invention can be applied as a device that uses the rotor position sensorless scheme to start up a motor having the potential to rotate before startup due to the effect of an external force such as wind or inertial force just after rotation has been stopped. In particular, the motor drive control device pertaining to the present invention can be applied as a device for driving and controlling a motor that rotates before startup due to an external force or the like and which has a so-called square reduction torque characteristic where the torque that becomes the load is proportional to the square of the motor rotational speed.

What is claimed is:

1. A motor drive control device that uses a rotor position sensorless control scheme to drive a motor having a rotor and a stator, the motor drive control device comprising:
  a rotational speed deriving component configured to derive a rotational speed of the motor at least at a time when the motor is in a state just before startup of the motor;
  a startup component configured to start up the motor by outputting to the motor a drive signal based on at least one of
    a direct-current excitation scheme that fixes the rotor position in a predetermined position by performing direct-current energization with respect to the motor and
    a forced drive scheme that accelerates the motor to a predetermined rotational speed by performing forced energization that applies a predetermined voltage and frequency with respect to the motor; and
  a changing component configured to change the drive signal based on at least one of the direct-current excitation scheme and the forced drive scheme in accordance with the rotational speed of the motor that the rotational speed deriving component has derived,
  when the startup component starts up the motor by outputting to the motor the drive signal based on the direct-current excitation scheme, the changing component changing voltage or current of the drive signal in accordance with the rotational speed of the motor, and
  in a case where the rotational speed of the motor just before startup is larger than a predetermined rotational speed, the changing component making voltage or current of the drive signal that is output to the motor in order to cause the motor to begin to start up smaller than a predetermined drive voltage or a predetermined drive current, respectively, that is output to the motor in a case where the motor begins to start up in a non-rotating state.

2. The motor drive control device according to claim 1, wherein
  the changing component continuously changes voltage or current of the drive signal in accordance with the rotational speed of the motor during a period of time from when the motor begins to start up to until the motor reaches a normal rotational state.

3. The motor drive control device according to claim 2, wherein
  during the period of time from when the motor begins to start up to until the motor reaches the normal rotational state, the changing component increases voltage or current of the drive signal in accordance with elapsed time after startup begins.

4. The motor drive control device according to claim 1, wherein
  the changing component continuously changes the voltage or current of the drive signal in accordance with elapsed time from when the motor begins to start up.

5. The motor drive control device according to claim 4, wherein
  during the period of time from when the motor begins to start up to until the motor reaches the normal rotational state, the changing component increases voltage or current of the drive signal in accordance with elapsed time after startup begins.

6. The motor drive control device according to claim 1, wherein
  during a period of time from when the motor begins to start up to until the motor reaches a normal rotational state, the changing component increases voltage or current of the drive signal as the rotational speed of the motor during that period of time becomes larger.

7. The motor drive control device according to claim 6, wherein
  during the period of time from when the motor begins to start up to until the motor reaches the normal rotational state, the changing component increases voltage or current of the drive signal in accordance with elapsed time after startup begins.

8. The motor drive control device according to claim 1, wherein
  during the period of time from when the motor begins to start up to until the motor reaches the normal rotational state, the changing component increases voltage or current of the drive signal in accordance with elapsed time after startup begins.

9. A motor drive control device that uses a rotor position sensorless control scheme to drive a motor having a rotor and a stator, the motor drive control device comprising:
  a rotational speed deriving component configured to derive a rotational speed of the motor at least at a time when the motor is in a state just before startup of the motor;
  a startup component configured to start UP the motor by outputting to the motor a drive signal based on at least one of
    a direct-current excitation scheme that fixes the rotor position in a predetermined position by performing direct-current energization with respect to the motor and
    a forced drive scheme that accelerates the motor to a predetermined rotational speed by performing forced energization that applies a predetermined voltage and frequency with respect to the motor; and
  a changing component configured to change the drive signal based on at least one of the direct-current excitation scheme and the forced drive scheme in accordance with the rotational speed of the motor that the rotational speed deriving component has derived,
  when the startup component starts up the motor by outputting to the motor the drive signal based on the forced drive scheme, the changing component changing frequency, voltage, or current of the drive signal in accordance with the rotational speed of the motor, and
  in a case where the rotational speed of the motor just before startup is larger than a predetermined rotational speed, the changing component making voltage or current of the drive signal that is output to the motor in order to cause the motor to begin to start smaller than a predetermined drive voltage or a predetermined drive current, respectively, that is output to the motor in a case where the motor begins to start up in a non-rotating state.

10. The motor drive control device according to claim 9, wherein
the changing component continuously changes voltage or current of the drive signal in accordance with the rotational speed of the motor during a period of time from when the motor begins to start up to until the motor reaches a normal rotational state.

11. The motor drive control device according to claim 10, wherein
during the period of time from when the motor begins to start up to until the motor reaches the normal rotational state, the changing component increases voltage or current of the drive signal in accordance with elapsed time after startup begins.

12. The motor drive control device according to claim 9, wherein
the changing component continuously changes the voltage or current of the drive signal in accordance with elapsed time from when the motor begins to start up.

13. The motor drive control device according to claim 12, wherein
during the period of time from when the motor begins to start up to until the motor reaches the normal rotational state, the changing component increases voltage or current of the drive signal in accordance with elapsed time after startup begins.

14. The motor drive control device according to claim 9, wherein
during a period of time from when the motor begins to start up to until the motor reaches a normal rotational state, the changing component increases voltage or current of the drive signal as the rotational speed of the motor during that period of time becomes larger.

15. The motor drive control device according to claim 14, wherein
during the period of time from when the motor begins to start up to until the motor reaches the normal rotational state, the changing component increases voltage or current of the drive signal in accordance with elapsed time after startup begins.

16. The motor drive control device according to claim 9, wherein
during the period of time from when the motor begins to start up to until the motor reaches the normal rotational state, the changing component increases voltage or current of the drive signal in accordance with elapsed time after startup begins.

* * * * *

UNITED STATES PATENT AND TRADEMARK OFFICE
CERTIFICATE OF CORRECTION

PATENT NO.         : 9,444,377 B2
APPLICATION NO.    : 14/417011
DATED              : September 13, 2016
INVENTOR(S)        : Toshiaki Sato Page 1 of 1

It is certified that error appears in the above-identified patent and that said Letters Patent is hereby corrected as shown below:

In the Claims

Claim 9 in Column 26, Line 41:
"a startup component configured to start UP the motor"

should read:
-- a startup component configured to start up the motor --

Signed and Sealed this
Twenty-first Day of February, 2017

Michelle K. Lee
*Director of the United States Patent and Trademark Office*